（12） United States Patent
Tierling et al.

(10) Patent No.: US 7,821,493 B2
(45) Date of Patent: *Oct. 26, 2010

(54) PROVIDING ENHANCED HAPTIC FEEDBACK EFFECTS

(75) Inventors: Kollin M. Tierling, Campbell, CA (US); Adam C. Braun, Sunnyvale, CA (US); Alex S. Goldenberg, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 810 days.

This patent is subject to a terminal disclaimer.

(21) Appl. No.: 11/787,495

(22) Filed: Apr. 16, 2007

(65) Prior Publication Data

US 2007/0285216 A1    Dec. 13, 2007

Related U.S. Application Data

(63) Continuation of application No. 09/908,184, filed on Jul. 17, 2001, now Pat. No. 7,218,310, which is a continuation-in-part of application No. 09/669,029, filed on Sep. 25, 2000, now abandoned.

(60) Provisional application No. 60/156,354, filed on Sep. 28, 1999.

(51) Int. Cl.
*G09G 5/00* (2006.01)
*G06F 3/00* (2006.01)

(52) U.S. Cl. ............... 345/156; 345/161; 345/163; 345/167; 715/701; 715/702

(58) Field of Classification Search ............... 345/156, 345/161, 163, 167, 157, 168, 173, 179; 700/701, 700/702; 715/701, 702
See application file for complete search history.

(56) References Cited

U.S. PATENT DOCUMENTS

| 4,787,051 A | 11/1988 | Olson |
| 5,186,629 A | 2/1993 | Rohen |
| 5,193,963 A | 3/1993 | McAffee et al. |

(Continued)

FOREIGN PATENT DOCUMENTS

EP    0 607 580    7/1994

(Continued)

OTHER PUBLICATIONS

Adachi, Yoshitaka et al., "Sensory Evaluation of Virtual Haptic Push-Buttons," Technical Research Center, 1994, 7 pages.

(Continued)

*Primary Examiner*—Kimnhung Nguyen
(74) *Attorney, Agent, or Firm*—Squire, Sanders & Dempsey, LLP

(57) ABSTRACT

Method and apparatus for providing tactile sensations. For one embodiment a first frequency at which to output a tactile sensation is received. A second frequency higher than the first frequency is determined. The second frequency is based on a frequency at which an inertial actuator outputs a second tactile sensation. A waveform having the first frequency and a waveform having the second frequency is combined to produce a signal configured to cause a composite tactile sensation at the second frequency, the composite tactile sensation conveying the first frequency.

28 Claims, 15 Drawing Sheets

U.S. PATENT DOCUMENTS

| | | | |
|---|---|---|---|
| 5,264,768 A | 11/1993 | Gregory et al. |
| 5,389,849 A | 2/1995 | Asano et al. |
| 5,396,266 A | 3/1995 | Brimhall |
| 5,435,729 A | 7/1995 | Hildreth et al. |
| 5,506,605 A | 4/1996 | Paley |
| 5,576,704 A | 11/1996 | Baker et al. |
| 5,589,828 A | 12/1996 | Armstrong |
| 5,589,854 A | 12/1996 | Tsai |
| 5,625,576 A | 4/1997 | Massie et al. |
| 5,629,594 A | 5/1997 | Jacobus et al. |
| 5,643,087 A | 7/1997 | Marcus et al. |
| 5,652,603 A | 7/1997 | Abrams |
| 5,656,901 A | 8/1997 | Kurita |
| 5,666,138 A | 9/1997 | Culver |
| 5,669,818 A | 9/1997 | Thorner et al. |
| 5,687,080 A | 11/1997 | Hoyt et al. |
| 5,714,978 A | 2/1998 | Yamanaka et al. |
| 5,731,804 A | 3/1998 | Rosenberg |
| 5,734,373 A | 3/1998 | Rosenberg et al. |
| 5,739,811 A | 4/1998 | Rosenberg et al. |
| 5,742,278 A | 4/1998 | Chen et al. |
| 5,745,057 A | 4/1998 | Sasaki et al. |
| 5,749,577 A | 5/1998 | Couch et al. |
| 5,767,839 A | 6/1998 | Rosenberg |
| 5,805,140 A | 9/1998 | Rosenberg et al. |
| 5,816,105 A | 10/1998 | Adelstein |
| 5,825,308 A | 10/1998 | Rosenberg |
| 5,914,705 A | 6/1999 | Johnson et al. |
| 5,952,806 A | 9/1999 | Muramatsu |
| 6,004,134 A | 12/1999 | Marcus et al. |
| 6,005,551 A | 12/1999 | Osborne et al. |
| 6,020,876 A | 2/2000 | Rosenberg et al. |
| 6,050,718 A | 4/2000 | Schena et al. |
| 6,104,382 A | 8/2000 | Martin et al. |
| 6,218,966 B1 | 4/2001 | Goodwin et al. |
| 6,219,034 B1 | 4/2001 | Elbing et al. |
| 6,275,213 B1 | 8/2001 | Tremblay et al. |
| 6,317,032 B1 | 11/2001 | Oishi |
| 6,424,356 B2 | 7/2002 | Chang et al. |
| 6,448,977 B1 | 9/2002 | Braun et al. |
| 6,452,586 B1 | 9/2002 | Holmdahl et al. |
| 6,468,158 B1 | 10/2002 | Ootori et al. |
| 6,487,421 B2 | 11/2002 | Hess et al. |
| 6,493,398 B1 | 12/2002 | Erisman |
| 6,531,998 B1 | 3/2003 | Gordon |
| 6,563,487 B2 | 5/2003 | Martin et al. |
| 6,686,901 B2 | 2/2004 | Rosenberg |
| 6,697,748 B1 | 2/2004 | Rosenberg et al. |
| 7,148,875 B2 | 12/2006 | Rosenberg et al. |
| 7,218,310 B2 * | 5/2007 | Tierling et al. .............. 345/156 |
| 2004/0233161 A1 | 11/2004 | Shahoian et al. |

FOREIGN PATENT DOCUMENTS

| | | |
|---|---|---|
| JP | 4-131924 | 5/1992 |
| JP | 07-113703 | 5/1995 |
| JP | 07-266263 | 10/1995 |
| JP | 11-299305 | 2/1999 |
| WO | WO 99/40504 A1 | 8/1999 |
| WO | WO 00/41788 | 7/2000 |

OTHER PUBLICATIONS

Ellis, R. E. et al., "Design and Evaluation of a High-Performance Prototype Planar Haptic Interface," DSC-vol. 49, Advances in Robotics, Mechatronics and Haptic Interfaces, ASME 1993, 1993, pp. 55-64.

Gobel, Matthias et al., "Tactile Feedback Applied to Computer Mice," International Journal of Human-Computer Interaction, vol. 7(1), 1995, pp. 1-24.

IBM Corporation, "Mouse Ball-Actuating Device with Force and Tactile Feedback," vol. 32, No. 9B, Feb. 1990, pp. 230-235.

Jackson, K. M., "Linearity of Radio-Frequency Transducers," Med. & Biol. Eng. and Computer, Jul. 1977, 15, pp. 446-449.

Millman, Paul A. et al., "Design of a Four Degree-of-Freedom Force-Reflecting Manipulandum with a Specified Force/Torque Workspace," Depart. Of Mechanical Engineering, 1991, pp. 1488-1493.

Minsky, Margaret Diane Rezvan "Computational Haptics: The Sandpaper System for Synthesizing Texture for a Force-Feedback Display," Ph.D. Dissertation, Massachusetts Institute of Technology, Jun. 1995, 217 pages.

Rosenberg, L.B. et al., "Commercially Viable Force Feedback Controller for Individuals with Neuromotor Disabilities," Crew Systems Directorate, Biodynamics and Biocommunications Division, Wright Patterson AFB, OH, May 1996, pp. 1-33.

\* cited by examiner

PROVIDING ENHANCED HAPTIC FEEDBACK EFFECTS

CROSS REFERENCE TO RELATED APPLICATIONS

This application is a continuation of U.S. patent application Ser. No. 09/908,184, entitled, "Providing Enhanced Haptic Feedback Effects", filed Jul. 17, 2001, now U.S. Pat. No. 7,218,310 by Kollin M. Tierling, Adam C. Braun and Alex F. Goldenberg. which is a continuation-in-part of U.S. patent application Ser. No. 09/669,029, entitled "Controlling Haptic Sensations for Vibrotactile Feedback Interface Devices," filed Sep. 25, 2000 now abandoned by Goldenberg et al., which claims the benefit of U.S. Provisional Application No. 60/156,354, filed Sep. 28, 1999, entitled, "Controlling Force Sensations for Vibrotactile Feedback Interface Devices," and which are incorporated herein by reference in their entirety.

BACKGROUND OF THE INVENTION

Embodiments of the invention relate generally to interface devices for allowing humans to interface with computer systems, and more particularly to low-cost computer interface devices that allow the user to provide input to computer systems and allow computer systems to provide tactile feedback to the user.

A user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a mouse, joystick, trackball, gamepad, steering wheel, stylus, tablet, pressure-sensitive sphere, remote control, or the like. Typically, the computer updates the environment in response to the user's manipulation of a manipulandum or user object such as a joystick handle or mouse, and provides visual and audio feedback to the user. The computer senses the user's manipulation of the user object using sensors provided on the interface device.

In some interface devices, haptic feedback is also provided to the user. These types of interface devices can provide physical sensations which are felt by the user manipulating the user object of the interface device. One or more motors or other actuators are coupled to the device housing or manipulandum and are connected to the controlling computer system. The computer system controls forces output by the actuators in conjunction and coordinated with displayed events. The computer system can thus convey physical force sensations to the user in conjunction with other supplied feedback as the user is grasping or contacting the interface device or manipulatable object of the interface device.

In many haptic feedback devices, the haptic feedback takes the form of vibrations, jolts, or pulses output on the housing or manipulandum which are experienced by the user, referred to as "tactile" sensations herein. For example, many gamepad devices include a spinning eccentric mass that creates inertial vibrations on the housing or object. Other devices, such as the I-Feel Mouse from Logitech Corp., provide inertial vibrations using a linearly-moving mass. Still other devices may vibrate a housing or object by impacting or directly moving the housing or object with the actuator.

One problem with current haptic feedback devices is that tactile sensations output to the user tend to be more effective in particular frequency ranges and less effective in other frequency ranges. For example, vibrations output on the housing by an inertial haptic feedback device often feel strong to the user at higher frequencies of vibration, but often feel less strong to the user at lower frequencies. In linearly-moving mass embodiments, for example, this is due to the inertial mass moving slower for lower frequency vibrations, so that the mass does not accelerate as much and causes tactile sensations that feel less strong. In addition, the mass might be pressed against the limits of its range of motion during most of the cycle time of the vibration, providing less force to be felt by the user.

Another problem with moving mass haptic feedback devices is that combining commanded effects may cause the mass to oscillate about a point close to an end of travel of the mass. This may cause the mass to hit the end of travel before it has completed the desired oscillation, thus clipping the output sensation and reducing its fidelity. In addition, output forces may be reduced in strength when the mass operates near an end of travel due to a physical spring coupled to the mass, since such spring resistance is strongest near the end of travel.

SUMMARY OF THE INVENTION

Embodiments of the invention include methods for providing tactile sensations. For one embodiment a first frequency at which to output a tactile sensation is received. A second frequency higher than the first frequency is determined. The second frequency is based on a frequency at which an inertial actuator outputs a second tactile sensation. A waveform having the first frequency and a waveform having the second frequency is combined to produce a signal configured to cause a composite tactile sensation at the second frequency, the composite tactile sensation conveying the first frequency.

These and other advantages of the present invention will become apparent to those skilled in the art upon a reading of the following specification of the invention and a study of the several figures of the drawing.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
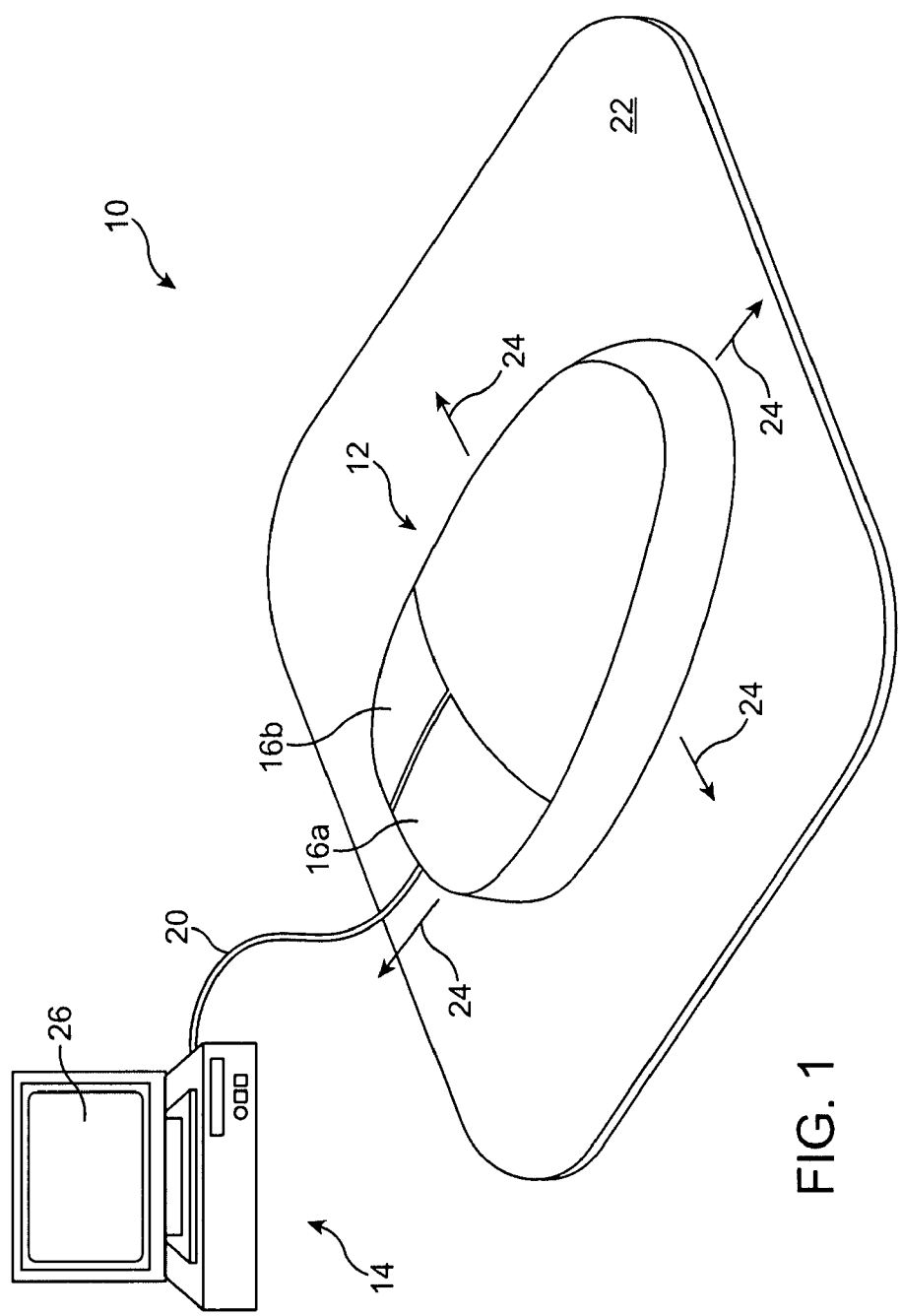
FIG. 1 is a perspective view of system including a haptic interface connected to a host computer in accordance with one embodiment of the invention.

FIG. 1 is a perspective view of a tactile feedback interface system 10, in accordance with one embodiment of the invention, capable of providing input to a host computer based on the user's manipulation of the interface device and capable of providing tactile feedback to the user of the system based on events occurring in a program implemented by the host computer. System 10 includes a device 12 and a host computer 14. In the described embodiment of FIG. 1, device 12 is a mouse, but can be other types of devices as discussed below.

Device 12 is an object that is preferably grasped, gripped, or otherwise physically contacted and manipulated by a user. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In other embodiments, a joystick, knob, wheel, button, or other user manipulandum may be moved. In addition, device 12 preferably includes one or more buttons 16a and 16b to allow the user to provide additional commands to the computer system. A scroll wheel, analog buttons or other inputs, or other controls can also be included.

Device 12 preferably includes an actuator assembly which is operative to produce forces on the device 12 and tactile sensations to the user. One example of an actuator assembly is described below with reference to FIG. 3.

In some embodiments, such as a mouse, device 12 rests on a ground surface 22 such as a tabletop or mousepad. A user grasps the mouse 12 and moves the mouse in a planar workspace on the surface 22 as indicated by arrows 24. Device 12 can be a relative sensing device or an absolute sensing device. In other embodiments, such as a gamepad, the device 12 may be held by the user.

Computer 14 is coupled to the device 12 by a bus 20, which communicates signals between device 12 and computer 14 and may also, in some preferred embodiments, provide power to the device 12. Components such as the actuator assembly require power that can be supplied from a conventional serial port or through an interface such as a USB or Firewire bus. In other embodiments, signals can be sent between device 12 and computer 14 by wireless transmission/reception. In some embodiments, the power for the actuator can be supplemented or solely supplied by a power storage device provided on the device, such as a capacitor or one or more batteries. Some such embodiments are disclosed in U.S. Pat. No. 5,691,898, incorporated herein by reference.

Host computer 14 can be a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game console systems commonly connected to a television set or other display, such as systems available from Nintendo, Sega, or Sony. In other embodiments, host computer system 14 can be a "set top box" or a "network-" or "internet-computer" which allows users to interact with a local or global network such as the Internet. Host computer preferably includes a host microprocessor, random access memory (RAM), read only memory (ROM), input/output (I/O) circuitry, and other components of computers well-known to those skilled in the art.

Host computer 14 preferably implements a host application program with which a user is interacting via device 12 and other peripherals, if appropriate, and which may include force feedback functionality. For example, the host application program can be a video game, word processor or spreadsheet, Web page or browser that implements HTML or VRML instructions, scientific analysis program, virtual reality training program or application, or other application program that utilizes input of device 12 and outputs force feedback commands to the device 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals received from the electronics and sensors of device 12, and outputs force values and/or commands to be converted into forces output for device 12.

Suitable software drivers which interface such simulation software with computer input/output (I/O) devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI.

In alternative embodiments, the device 12 can instead be a different interface device or control device. For example, handheld devices are very suitable for the actuator assemblies described herein. A hand-held remote control device used to select functions of a television, video cassette recorder, sound stereo, internet or network computer (e.g., Web-TV™). Furthermore, a gamepad controller for video games or computer games can be used with the tactile feedback components and methods described herein, where the user grips the gamepad housing while operating buttons, joysticks, dials, spheres, or other controls on the gamepad. Other interface devices may also make use of the actuator assemblies described herein. For example, a joystick handle can include an actuator assembly, where tactile sensations are output on the joystick handle as the sole tactile feedback or to supplement kinesthetic force feedback in the degrees of freedom of the joystick. Trackballs, steering wheels, styluses, rotary knobs, linear sliders, gun-shaped targeting devices, medical devices, spheres, grips, etc. can also make use of the actuator assemblies described herein to provide haptic sensations.

Figure 2:
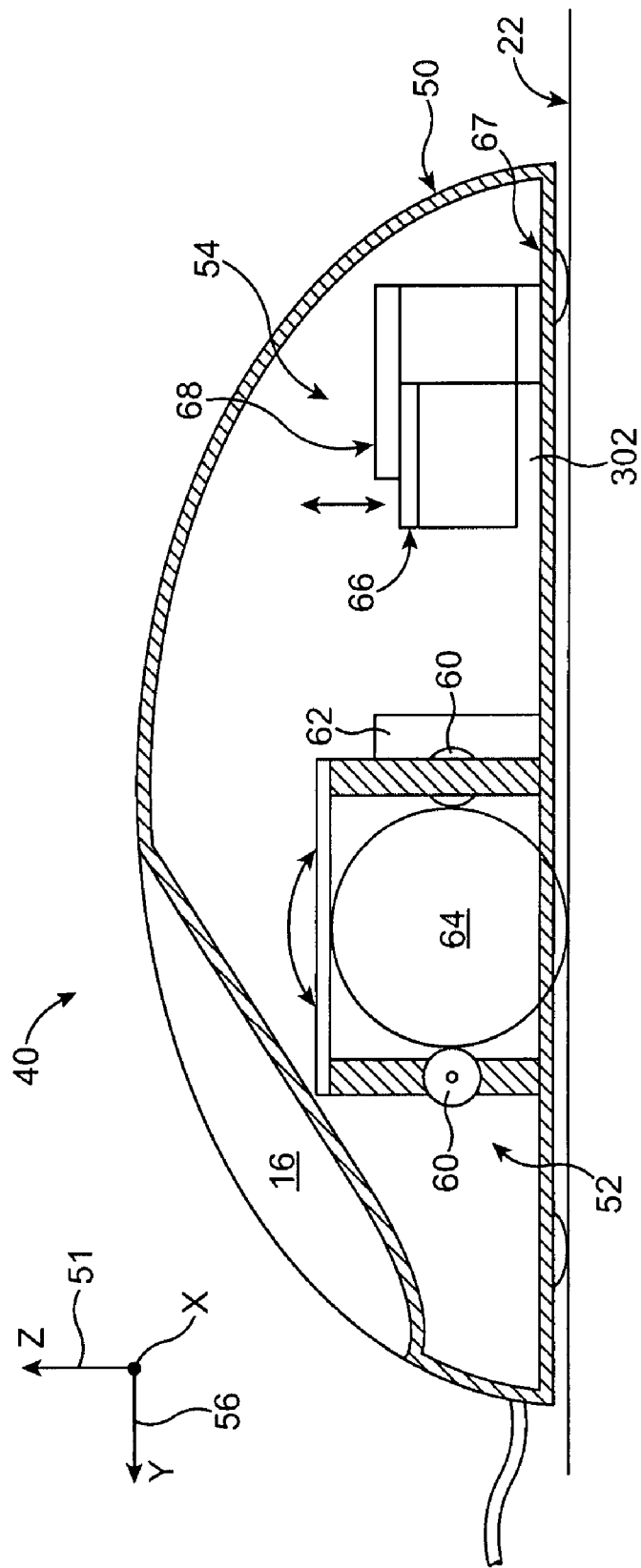
FIG. 2 is a side cross sectional view of the haptic interface device of FIG. 1.

FIG. 2 is a side cross-sectional view of one embodiment of device 12 of FIG. 1. Device 12 includes one or more actuator assemblies for imparting haptic feedback such as tactile sensations to the user of the device. The actuator assembly outputs forces on the device which the user is able to feel.

Device 12 includes a housing 50, a sensing, system 52, and an actuator assembly 54. Housing 50 is shaped to fit the user's hand, in the example shown, like a standard mouse while the user moves the mouse in the planar degrees of freedom and manipulates the buttons 16. Other housing shapes can be provided in many different embodiments.

Sensor 52 detects the position of the mouse in its planar degrees of freedom, e.g. along the X and Y axes. In the example shown, sensor 52 includes a standard mouse ball 64 for providing directional input to the computer system. Ball 64 is a sphere that extends partially out the bottom surface of the mouse and rolls in a direction corresponding to the motion of the mouse on a planar surface 22. The ball motion can be tracked by cylindrical rollers 60 which are coupled to sensors, such as sensor 62, for detecting the motion of the cylinders corresponding to x and y motion of the mouse. Other types of mechanisms and/or electronics for detecting planar motion of the device 12 can be used in other embodiments. For example, an optical sensor can be used to detect motion of the device relative to the planar support surface by optically taking and storing a number of images of the surface and comparing those images over time to determine if the mouse has moved, as is well known in the art.

Buttons 16 can be selected by the user as a "command gesture" when the user wishes to input a command signal to the host computer 14. A scroll wheel can also be include to provide additional input to the host computer.

Device 12 includes an actuator assembly 54, and the actuator assembly includes an actuator 66 and a flexure mechanism ("flexure") 68 coupled to the actuator 66 by the flexure 68. In the described embodiment, the actuator 66 acts as an inertial mass, so that a separate inertial mass is not required; this is described in greater detail with respect to FIG. 3. The actuator acting as inertial mass is oscillated in a linear direction by the actuator 66, such as approximately along the z-axis 51 which is approximately perpendicular to the planar workspace of the mouse in the x- and y-axes. The actuator is coupled to the housing 50 of the mouse such that inertial forces caused by the motion of the inertial mass are applied to the housing of the mouse, thereby conveying haptic feedback such as tactile sensations to the user of the mouse who is contacting the housing. These type of tactile sensations are different from kinesthetic haptic sensations, which are caused by the user directly contacting a moved (forced) object without a compliant flexure between the user and object. The mouse device can apply inertial forces substantially along the z axis, orthogonal to the planar x and y axes of the mouse controller.

Many types of actuators can be used, such as DC motors, a moving magnet actuator, a stepper motor, a pneumatic/hydraulic actuator, a torquer (motor with limited angular range), shape memory alloy material (wire, plate, etc.), a piezo-electric actuator, etc. In other embodiments, a linear force can be output using a linearly moving element, as in a voice coil actuator or a linear moving-magnet actuator, which are suitable for high bandwidth actuation. These embodiments are described in greater detail in U.S. Pat. No. 6,211,861, which is incorporated herein by reference. A variety of tactile sensations can be output to the user, many of which are described in greater detail in copending application Ser. No. 09/585,741, incorporated herein by reference.

A flexible or semi-flexible surface can be provided between the mouse and the ground surface, such as a standard mouse pad, a layer of rubber provided on the underside of the mouse or between portions of the mouse housing, etc. This type of flexible surface increases the transmissibility of the inertial forces from the actuator to the housing. In handheld device embodiments such as gamepads, no such flexible surface or layer is required.

Figure 3:
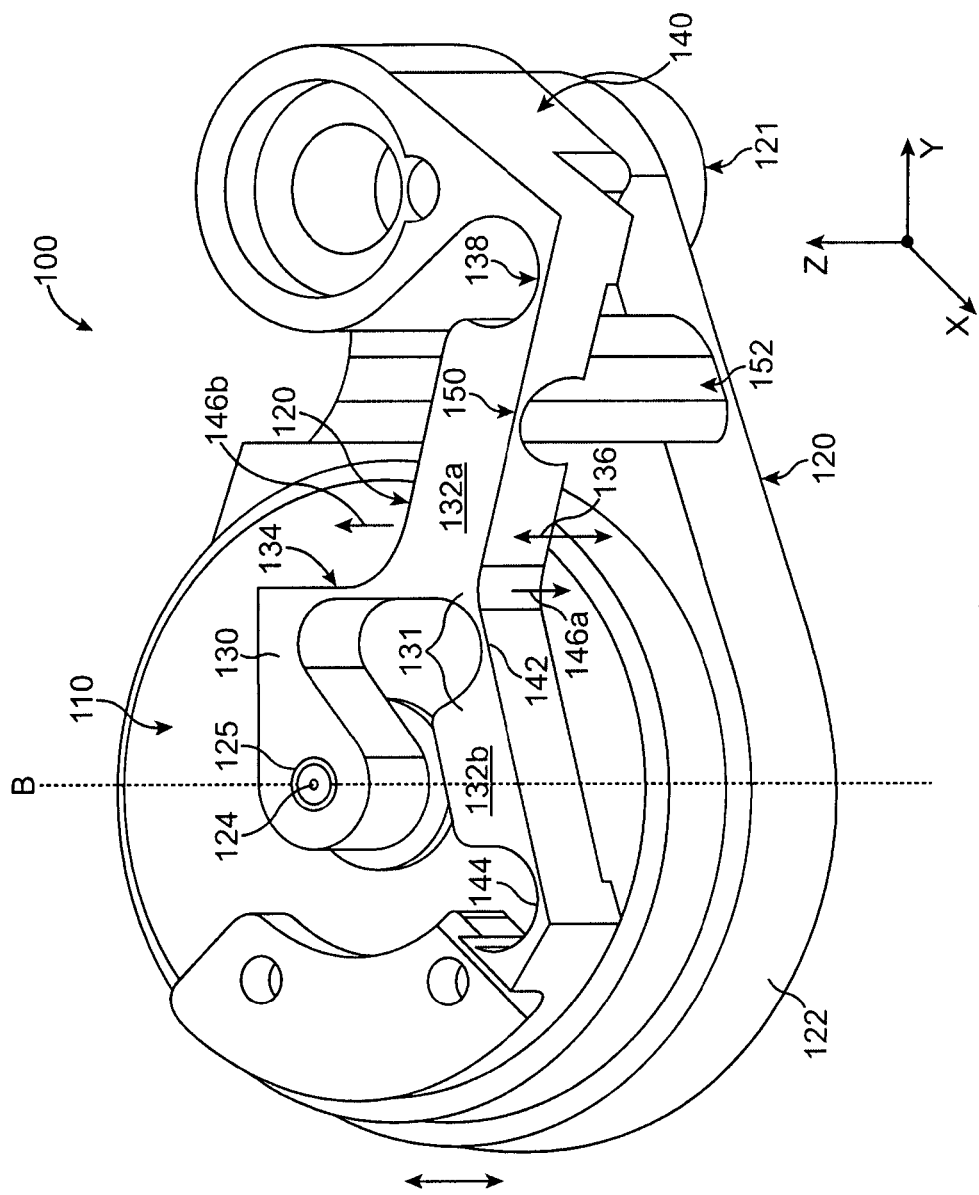
FIG. 3 is a perspective view of one embodiment of an actuator assembly suitable for use with various embodiments of the invention.

FIG. 3 is a perspective view of one embodiment 100 of the actuator assembly 50 for use in the remote control 12. Actuator assembly 100 includes a grounded flexure 120 and an actuator 110 coupled to the flexure 120. The flexure 120 can be a single, unitary piece made of a material such as polypropylene plastic ("living hinge" material) or other flexible material. Flexure 120 can be grounded to the housing of the device 12, for example, at portion 121.

Actuator 110 is shown coupled to the flexure 120. The housing of the actuator is coupled to a receptacle portion 122 of the flexure 120 which houses the actuator 110 as shown. A rotating shaft 124 of the actuator is coupled to the flexure 120 in a bore 125 of the flexure 120 and is rigidly coupled to a central rotating member 130. The rotating shaft 124 of the actuator is rotated about an axis B which also rotates member 130 about axis B. Rotating member 130 is coupled to a first portion 132a of an angled member 131 by a flex joint 134. The flex joint 134 preferably is made very thin in the dimension it is to flex so that the flex joint 134 will bend when the rotating portion 130 moves the first portion 132a approximately linearly. The first portion 132a is coupled to the grounded portion 140 of the flexure by a flex joint 138 and the first portion 132a is coupled to a second portion 132b of the angled member by flex joint 142. The second portion 132b, in turn, is coupled at its other end to the receptacle portion 122 of the flexure by a flex joint 144.

The angled member 131 that includes first portion 132a and second portion 132b moves linearly along the x-axis as shown by arrow 136. In actuality, the portions 132a and 132b move only approximately linearly. When the flexure is in its origin position (rest position), the portions 132a and 132b are preferably angled as shown with respect to their lengthwise axes. This allows the rotating member 130 to push or pull the angled member 131 along either direction as shown by arrow 136.

The actuator 110 is operated in only a fraction of its rotational range when driving the rotating member 130 in two directions, allowing high bandwidth operation and high frequencies of pulses or vibrations to be output. To channel the compression or stretching of the flexure into the desired z-axis motion, a flex joint 152 is provided in the flexure portion between the receptacle portion 122 and the grounded portion 140. The flex joint 152 allows the receptacle portion 122 (as well as the actuator 110, rotating member 130, and second portion 132*b*) to move (approximately) linearly in the z-axis in response to motion of the portions 132*a* and 132*b*. A flex joint 150 is provided in the first portion 132*a* of the angled member 131 to allow the flexing about flex joint 152 in the z-direction to more easily occur.

By quickly changing the rotation direction of the actuator shaft 124, the actuator/receptacle can be made to oscillate along the z-axis and create a vibration on the housing with the actuator 110 acting as an inertial mass. In addition, the flex joints included in flexure 120, such as flex joint 152, act as spring members to provide a restoring force toward the origin position (rest position) of the actuator 110 and receptacle portion 132. In some embodiments, the stops can be included in the flexure 120 to limit the motion of the receptacle portion 122 and actuator 110 along the z-axis.

Other embodiments can provide other types of actuator assemblies, such as an eccentric mass coupled to a rotating shaft of an actuator to provide rotational inertial tactile sensations to the housing. The eccentric mass can be unidirectionally driven or bidirectionally driven. Other types of actuator assemblies may also be used, as disclosed in U.S. Pat. No. 6,184,868, such as a linear voice coil actuator, solenoid, moving magnet actuator, etc.

Figure 4:
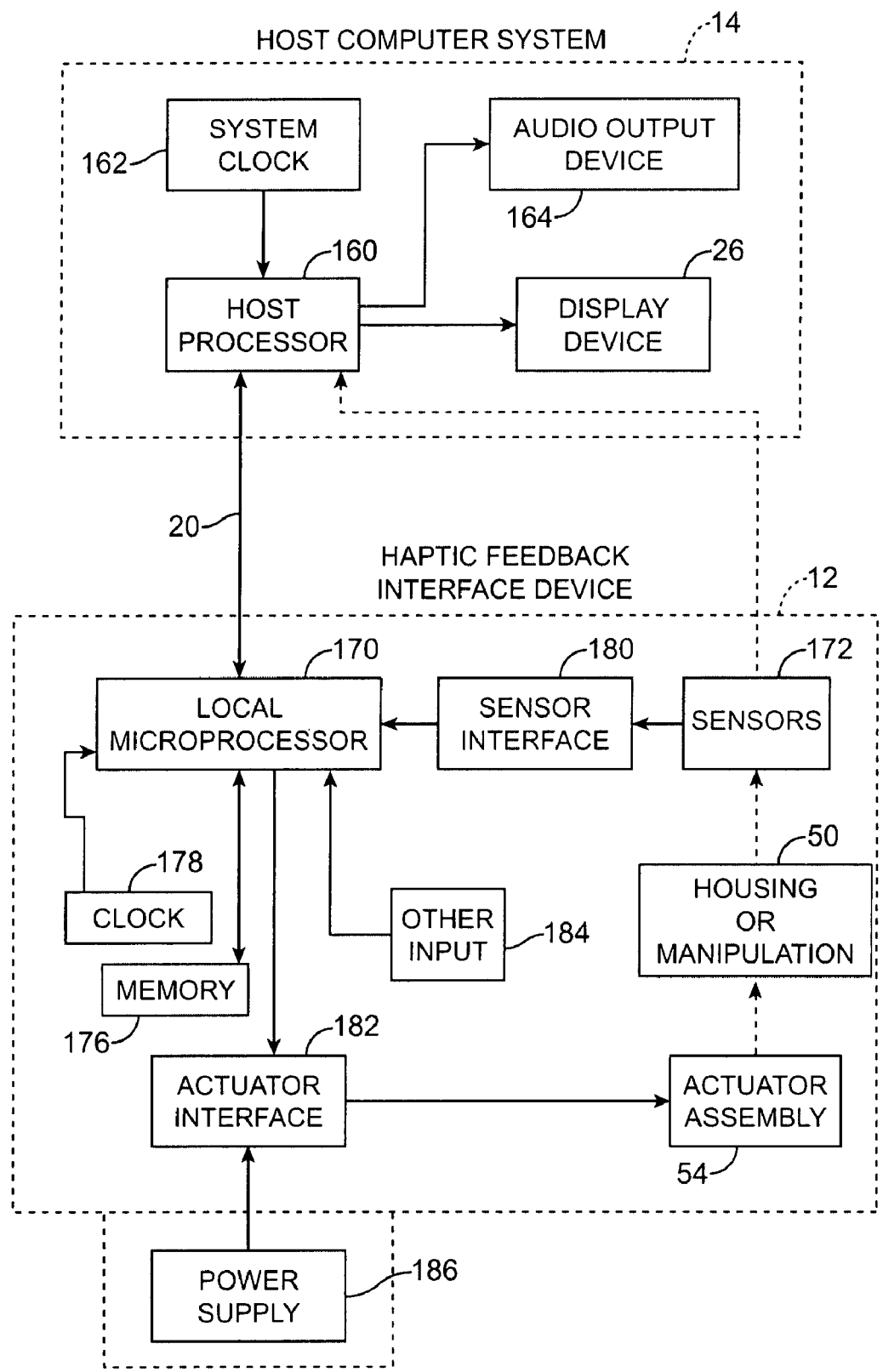
FIG. 4 is a block diagram illustrating an embodiment of the haptic interface device and host computer for use with embodiments of the invention.

FIG. 4 is a block diagram illustrating one embodiment of a haptic feedback system suitable for use with embodiments of the invention including a local microprocessor and a host computer system.

Host computer system 14 may include a host microprocessor 160, a clock 162, a display screen 26, and an audio output device 164. The host computer also includes other well known components, such as random access memory (RAM), read-only memory (ROM), and input/output (I/O) electronics (not shown). Display screen 26 displays images of a game environment, operating system application, simulation, etc. Audio output device 164, such as speakers, is preferably coupled to host microprocessor 160 provides sound output to user when an "audio event" occurs during the implementation of the host application program. Other types of peripherals can also be coupled to host processor 160, such as storage devices (hard disk drive, CD ROM drive, floppy disk drive, etc.), printers, and other input and output devices.

The interface device, such as mouse 12, is coupled to host computer system 14 by a bi-directional bus 20 The bi-directional bus sends signals in either direction between host computer system 14 and the interface device. Bus 20 can be a serial interface bus, such as an RS232 serial interface, RS-422, Universal Serial Bus (USB), Firewire (1394), MIDI, or other protocols well known to those skilled in the art; or a parallel bus or wireless link. For example, the USB standard provides a relatively high speed interface that can also provide power to the actuator of actuator assembly.

Device 12 can include a local microprocessor 170. Processor 170 is considered local to device 12, where "local" herein refers to processor 170 being a separate microprocessor from any processors in host computer system 14. Microprocessor 170 can be provided with software instructions to wait for commands or requests from computer host 14, decode the command or request, and handle/control input and output signals according to the command or request. In addition, processor 170 can operate independently of host computer 14 by reading sensor signals and/or calculating appropriate forces from sensor signals, time signals, and stored or relayed instructions selected in accordance with a host command. Microprocessor 170 can include one microprocessor chip, multiple processors and/or co-processor chips, and/or digital signal processor (DSP) capability, or can be implemented as digital logic, state machines, ASIC, etc.

Microprocessor 170 can receive signals from sensor(s) 172 and provide signals to actuator assembly 54 in accordance with instructions provided by host computer 14 over bus 20. For example, in a local control embodiment, host computer 14 provides high level supervisory commands to microprocessor 170 over bus 20, and microprocessor 170 decodes the commands and manages low level force control loops to sensors and the actuator in accordance with the high level commands and independently of the host computer 14. This operation is described in greater detail in U.S. Pat. No. 5,734,373, incorporated by reference herein. In the host control loop, force commands are output from the host computer to microprocessor 170 and instruct the microprocessor to output a force or force sensation having specified characteristics. The local microprocessor 170 reports data to the host computer, such as locative data that describes the position of the device in one or more provided degrees of freedom. The data can also describe the states of buttons, switches, etc. The host computer uses the data to update executed programs. In the local control loop, actuator signals are provided from the microprocessor 170 to actuator assembly 54 and sensor signals are provided from the sensor 172 and other input devices 184 to the microprocessor 170. Herein, the term "tactile sensation" or "tactile effect" refers to either a single force or a sequence of forces output by the actuator assembly 54 which provide a sensation to the user. For example, vibrations, a single jolt or pulse, or a texture sensation are all considered tactile sensations. The microprocessor 170 can process inputted sensor signals to determine appropriate output actuator signals by following stored instructions. The microprocessor may use sensor signals in the local determination of forces to be output on the user object, as well as reporting locative data derived from the sensor signals to the host computer.

In a different, host-controlled embodiment, host computer 14 can provide low-level force commands over bus 20, which are directly transmitted to the actuator assembly 54 via microprocessor 170 or other (e.g. simpler) circuitry. Host computer 14 thus directly controls and processes all signals to and from the device 12, e.g. the host computer directly controls the forces output by actuator assembly 54 and directly receives sensor signals from sensor 172 and input devices 184. In host control embodiments, the signal from the host to the device can be a single bit that indicates whether to pulse the actuator at a predefined frequency and magnitude; or can include a magnitude; and/or can include a direction; or, a local processor can be used to receive a simple command from the host that indicates a desired force value to apply over time; or a high-level command with tactile sensation parameters can be passed to the local processor on the device which can then apply the full sensation independent of host intervention. A combination of numerous methods described above can also be used for a single device 12.

Local memory 176, such as RAM and/or ROM, is preferably coupled to microprocessor 170 in device 12 to store instructions for processor 170 and store temporary and other data. In addition, a local clock 178 can be coupled to the microprocessor 170 to provide timing data.

Sensors 172 sense the position or motion of the device (e.g. the housing or a manipulandum) in its degrees of freedom and provides signals to microprocessor 170 (or host 14) including information representative of the position or motion. Sensors suitable for detecting motion of the device include digital optical encoders, other optical sensors, linear optical encoders, potentiometers, optical sensors, magnetic sensors, velocity sensors, acceleration sensors, strain gauge, or other types of sensors can also be used, and either relative or absolute sensors can be provided. Optional sensor interface 180 can be used to convert sensor signals to signals that can be interpreted by the microprocessor 170 and/or host computer system 14, as is well known to those skilled in the art.

Actuator assembly 54 transmits forces to the housing of the device as described above with reference to FIG. 3 in response to signals received from microprocessor 170 and/or host 14. In the described embodiment, actuator assembly 54 is provided to generate inertial forces by moving an inertial mass; tactile forces can be generated in other ways in other embodiments. Actuator interface 182 can be optionally connected between actuator assembly 54 and microprocessor 170 to convert signals from microprocessor 170 into signals appropriate to drive actuator assembly 54. Interface 182 can include power amplifiers, switches, digital to analog controllers (DACs), analog to digital controllers (ADCs), and other components, as is well known to those skilled in the art.

Other input devices 184 are included in device 12 and send input signals to microprocessor 170 or to host 14 when manipulated by the user. Such input devices include buttons and can include additional, dials, switches, scroll wheels, or other controls or mechanisms. Power supply 186 can optionally be included in device 12 coupled to actuator interface 182 and/or actuator assembly 54 to provide electrical power to the actuator, or be provided as a separate component. Alternatively, power can be drawn from a power supply separate from device 12, or power can be received across a bus such as USB or a wireless link. Also, received power can be stored and regulated by mouse 12 and thus used when needed to drive actuator assembly 54 or used in a supplementary fashion.

Enhancing Tactile Sensations

Various alternative embodiments of the invention include methods for enhancing the feel of tactile sensations, especially those sensations provided by inertial haptic feedback mechanisms, such as the actuator assembly 100 of FIG. 3, rotational eccentric masses, or the like.

When using an inertial actuator assembly such as assembly 100 shown in FIG. 3, some limitations on the strength of tactile sensations become evident. One limitation is that there tends to be limited power available to drive the actuator in most consumer applications, such as mice, gamepads, remote controls, etc. Some mouse embodiments, for example, draw power from the communication bus, such as USB. The limited power means that the inertial mass will not be able to swing through its full amplitude motion across a wide range of driving frequencies.

Another limitation is the limited range of motion of the inertial mass in assembly 100, i.e. the moving actuator is only moved a certain distance before it encounters physical limits to its travel. Even if sufficient power is available to drive the actuator, the assembly 100 relies on the acceleration of an inertial mass to impart forces upon the user. These accelerations are strong when the mass is driven by a high frequency periodic signal because the mass is driven back and forth very quickly, undergoing significant accelerations and decelerations during a given time period. But when driving the inertial mass at a low frequency, the sensation to the user is weak even if enough power is available to drive the mass. This is because the inertial mass has a very limited range of motion within which to accelerate the mass. A low frequency periodic drive signal will impart much weaker inertial forces upon the user because the inertial mass is pressed against one of the limit stops during much of the signal time. This limited range of motion may be desirable in other aspects of the assembly design, e.g. a low profile so it will fit in small devices, but it detracts from the strength of the low frequency tactile sensations.

The methods described herein combine a higher frequency with a desired low frequency to provide a resulting signal that produces greater strength tactile sensations output to the user. The term "combining" is intended to include both the pulse bursts embodiment, in which higher frequency bursts are output at a low frequency, as well as the other embodiments which add and/or multiply high frequency and low frequency signals or components thereof.

Pulse Bursts

A method in accordance with one embodiment of the invention provides "pulse bursts" at particular portions of a low frequency waveform to generate higher strength tactile sensations.

Figure 5A:
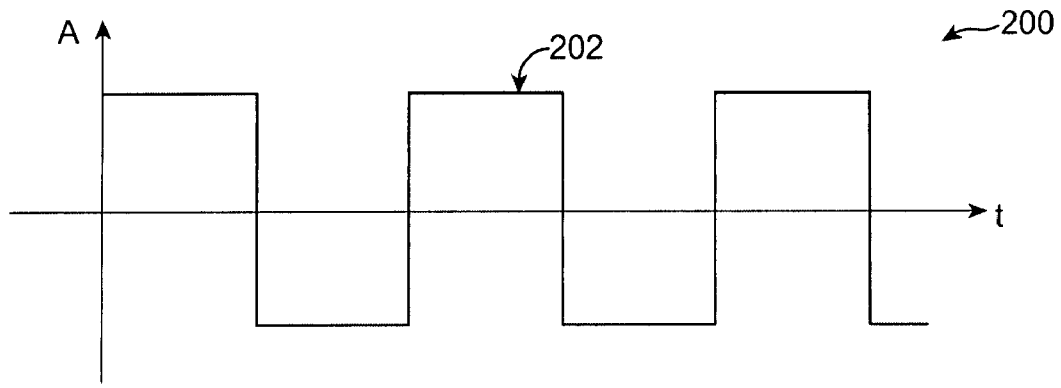
FIGS. 5a-5c are graphs illustrating a method for using resonance pulse bursts to provide stronger low frequency tactile sensations in accordance with one embodiment of the invention.

FIG. 5a is a graph 200 illustrating a standard drive signal 202 for the actuator assembly 100. Drive signal 202 is a periodic signal having a lower frequency in the available frequency range, e.g. 5 Hz in a discernible range of 0-200 Hz. The positive signals of the waveform drive the inertial mass in one direction, while the negative signals of the waveform drive the inertial mass in the opposite direction. Signal 202 is shown as a square wave as an example, but can be any other type of repeating, periodic waveform, such as a sine wave, triangle wave, sawtooth-shaped wave, etc.

The strength of the tactile sensation resulting from the waveform 202 would be quite weak, because the inertial mass is pressed against the limits of its range of motion during most of the cycle time. The inertial mass is moved to its opposite position in its range in only the first portion of each flat portion of the waveform, so that it is not moving for the rest of each flat portion.

Figure 5B:
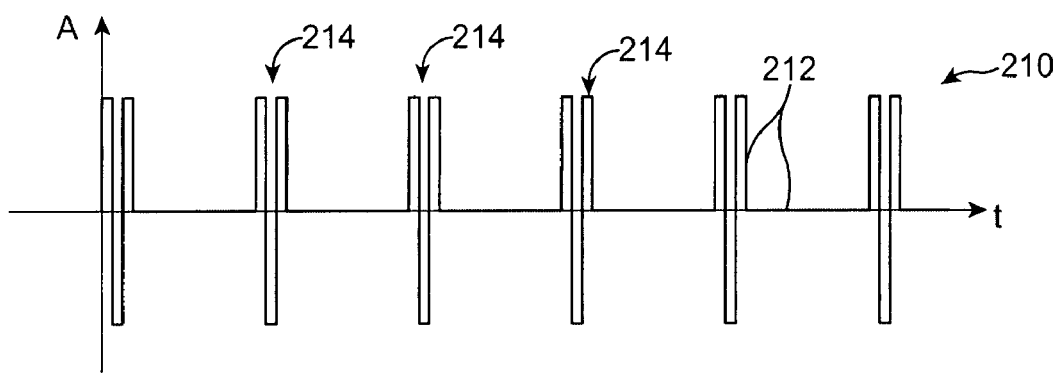

FIG. 5b is a graph 210 illustrating a drive waveform 212 which conveys the sensation of a low frequency waveform while allows the moving inertial mass to impart more inertial energy to the user in accordance with one embodiment of the invention. The waveform 212 is intended to convey the same low frequency of the waveform 202 shown in FIG. 5a. To accomplish this, waveform 212 includes a high frequency "burst" 214 periodically output to convey the desired frequency of the waveform 202. Each burst 214 is a number of oscillations of the inertial mass at the high frequency, and each burst conveys a "pulse" to the user. The bursts are output periodically to convey the desired lower frequency. For example, each burst 214 can be output at approximately the same point in time each rising or falling edge of the waveform 202 occurs, as shown in FIG. 5b. This would provide a pulse to the user twice per period of the low frequency waveform. Alternatively, each burst 214 can be output at approximately each rising edge of the waveform 202; this would convey a pulse to the user once per period of the low frequency waveform (the pulses can alternatively be output at falling edges of waveform 202). Either of these methods can be used, and the choice of one or the other may depend on what the designer expects, e.g., a specified 5 Hz low frequency could mean 10 pulses or 5 pulses per second, based on the method used. In any case, the bursts are effectively output at the rate of a desired low frequency.

The bursts allow a low frequency sensation to be conveyed to the user at a much higher strength than if no bursts were used. The bursts can be at a high enough frequency that the user cannot distinguish them as oscillations; the user preferably only feels a single pulse. Furthermore, the bursts should be at a high enough frequency to provide high strength sensations to the user. For example, the frequency of each burst can be 40 Hz. The frequency of the bursts can be retrieved from memory by the processor forming the controlling waveform. The burst frequency can also optionally be specified by a user and communicated over the communication link.

The length of each burst can vary in different embodiments. Four changes of direction of the inertial mass are shown in the example of FIG. 4b; in other embodiments, more or less changes of direction can be performed. The bursts should have a significant portion of the waveform separating them, or else the user may not be able to distinguish one burst from another, and therefore would feel only the high frequency of the pulses, not the intended low frequency. For example, the bursts can be limited to a particular percentage (e.g. 20%) of the period of the desired low frequency waveform.

In practice, it may be desirable to pick a frequency that is high enough that a few full cycles can easily be included in the burst. For example, an 80 Hz signal can be used. This would allow four full cycles to be imparted within only 50 milliseconds. If this technique were to be used to convey a 1 Hz tactile effect, the signal used to drive the mass would have a 50 millisecond burst of the 80 Hz signal, where 950 milliseconds is provided between bursts. The resulting tactile feel is much stronger to the user than a simple 1 Hz square wave.

The bursts need only be used at low frequencies to convey greater strength tactile sensations. At higher frequencies, the bursts are not needed since the sensations are stronger. Furthermore, as the commanded frequency increases, the bursts may run too closely together and thus convey only the high frequency of the burst to the user, rather than the commanded lower frequency. Thus, a threshold frequency can be established, under which bursts are used, and over which bursts are not used and the commanded frequency is directly output.

In other embodiments, the high frequency bursts described above can be output at irregular or nonperiodic intervals. For example, a particular gun may have two closely-spaced bursts followed by three widely-spaced bursts. These five bursts can be defined in a waveform of a particular duration. The defined waveform can also be repeated, if desired, or started again from a selected point in the duration of the defined waveform.

Figure 5C:
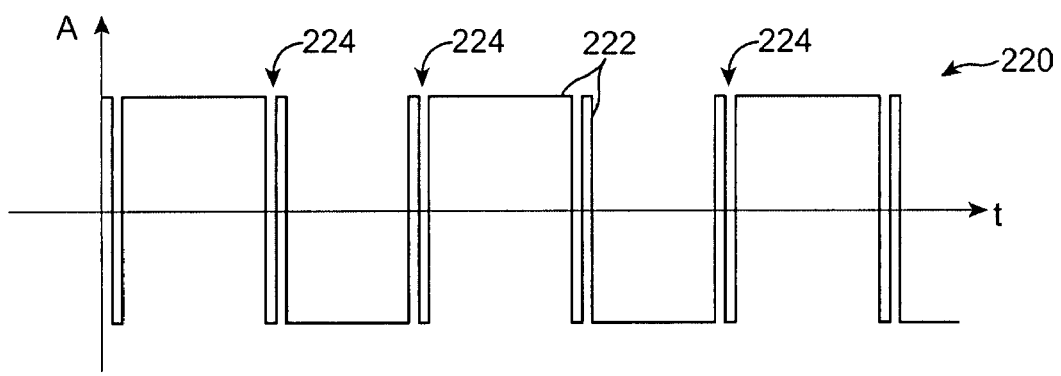

FIG. 5c is a graph 220 illustrating an alternate drive waveform 222 for providing higher strength low frequency tactile sensations in accordance with one embodiment of the invention. In this embodiment, the drive signal can settle at the extreme amplitudes of the signal, as shown, rather than settling at zero as shown in FIG. 5b.

Resonance

Another way to increase the strength of tactile sensations provided by an oscillating mass is to drive the actuator at a resonant frequency of the harmonic system. Like any spring-mass harmonic system, the actuator assembly and housing of the device can be excited at a resonance frequency and yield maximum output for a given input using the physical resonance properties of the mechanical system. This physical amplification can be harnessed for additional efficiency in conveying tactile sensations.

For example, when an interface device 12 is designed, the properties and dimensions of the housing, actuator assembly, and other components can be made a certain way to provide one or more particular resonance frequencies in the mechanical system. The strongest sensations of the device are typically those having a frequency near the resonant frequency(ies). Other aspects of tuning a resonant frequency system are described in copending patent application Ser. No. 09/675,995, incorporated herein by reference. Some embodiments may only be able to approximately provide oscillations at a desired resonance frequency, due to unavoidable tolerances in manufacturing that may cause changes in the resonance frequency of the mechanical system.

In one embodiment of the invention, the pulse bursts described with reference to FIGS. 5b and 5c can be used with the resonant frequency described above. For example, the frequency of the bursts 214 or 224 can be provided at or near the designed resonance frequency of the mechanical system.

In such an embodiment, it may be important to provide enough cycles of the resonance frequency in the burst to allow the inertial mass to approach its maximum acceleration. For example, this can be three cycles. For example, if a very strong 1 Hz tactile sensation is desired for a tactile mouse with actuator assembly 100 and a resonance frequency of 40 Hz, a strong sensation can be achieved by providing a 75 millisecond burst at 40 Hz, where the burst repeats every 1000 milliseconds, or 925 ms between bursts. The end result is a 1 Hz sensation that is many orders of magnitude stronger than if the mass were driven directly by a 1 Hz square wave.

If this combined method is used, it may be desirable to tune the resonant frequency of the actuator assembly and mechanical system upwards. A higher resonant frequency allows shorter bursts to be used for the same number of cycles. Shorter bursts are more versatile than longer ones because shorter bursts can be used to emulate higher frequency sensations.

Superimposing Low Frequency Sensations and High Frequency Sensations

Low and high frequency sensations can be superimposed as described herein for at least two purposes. One purpose is to provide a desired low frequency sensation that is perceived much more strongly to the user than if the low frequency waveform were directly used to drive the actuator assembly 100, similar to the reasons for using the method described above with reference to FIGS. 5b and 5c. Another purpose is to combine two (or more) tactile sensations, where the magnitude of the combined tactile sensation is not appreciably attenuated by the limited range of the inertial mass of the actuator assembly. The techniques described herein can achieve these desired results.

Strong Low Frequency Sensations

Strong low frequency sensations can be output using the present method. In a different embodiment from the pulse burst embodiment described above, a commanded low frequency sensation can be superimposed with a "dummy" high frequency signal to provide stronger low frequency sensations to the user. In basic terms, a high frequency waveform is output to provide the stronger tactile sensation to the user, but the high frequency waveform is modified or modulated according to the desired low frequency so as to convey the sense of the low frequency in the tactile sensation perceived by the user.

Figure 6:
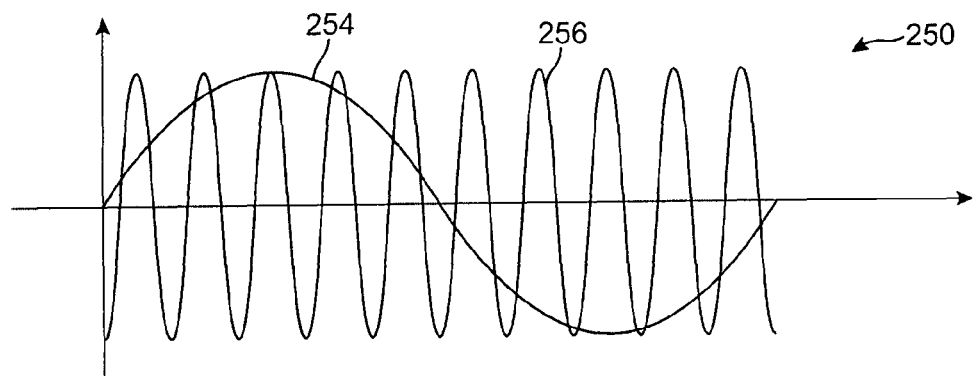
FIGS. 6 and 7 are graphs illustrating another method for providing a strong low frequency tactile sensation by adding it with a higher frequency sensation in accordance with one embodiment of the invention.
Figure 7:
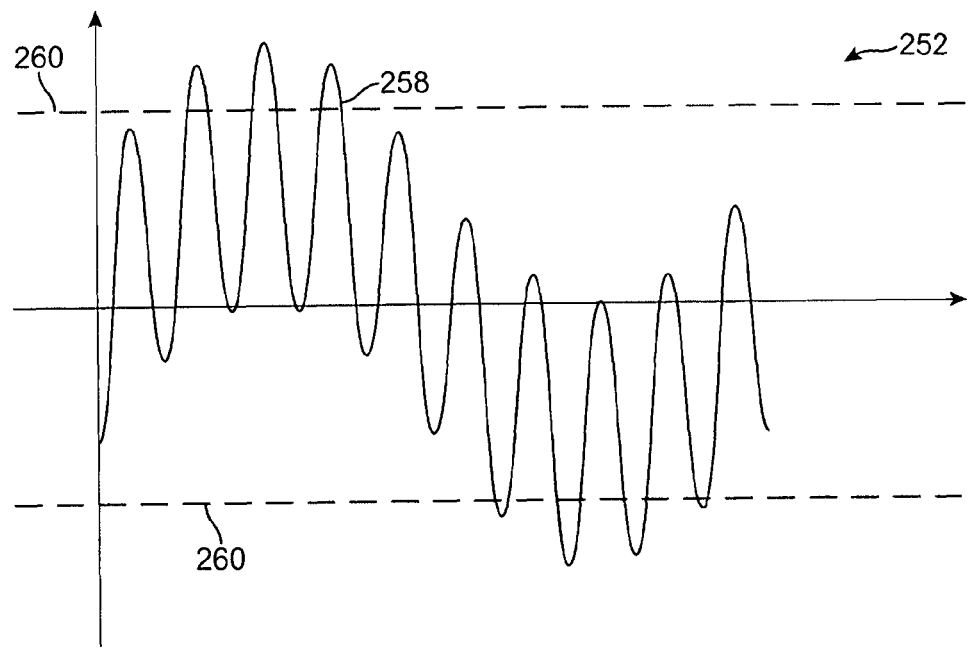

FIGS. 6 and 7 are graphs 250 and 252, respectively, illustrating a first method of superimposing high and low frequency waveforms to provide a greater-strength low frequency sensation. In FIG. 6, two signals are shown, a signal 254 at the commanded (desired) frequency, and a signal 256 at a higher frequency. In this embodiment, the signal 254 having the desired low frequency is added to the high frequency signal 256 that is created specifically for the present method. The high frequency signal 256 can be at any relatively high frequency; in some embodiments, it is preferably near a frequency which the actuator assembly 100 efficiently outputs strong sensations, e.g. at or near a resonance frequency of the mechanical system.

FIG. 7 shows a waveform 258 which is the sum of the two signals 254 and 256 shown in FIG. 6. Waveform 258 provides a high frequency waveform at amplitudes that vary according to the low frequency, so that the user perceives the low frequency as "riding on" the high carrier frequency. The high frequency oscillations allow the actuator assembly to output strong tactile sensations, while the low frequency motion provides an oscillation perceived by the user at the desired low frequency. As in the embodiment of FIGS. 5b and 5c, a threshold low frequency can be established, where if the desired frequency is under the threshold frequency, the high frequency signal is added to the desired signal, and where if the desired frequency is over the threshold frequency, which only the desired signal is used to drive the actuator assembly, since it is of sufficient frequency to be output as a strong sensation.

As in the resonance pulse burst embodiment described above, the adding can be performed only for desired frequency outputs that are below a predetermined threshold frequency. Below the threshold frequency, the waveform is too low a frequency to be felt by the user at a compelling magnitude, so the waveform is added to a high frequency waveform. Above the threshold frequency, the waveform is output at a sufficiently high magnitude to be easily felt by the user when it is directly output without summing.

One disadvantage that can occur with some embodiments of haptic feedback devices is that the summed waveform 258 may reach a saturation point and thus cause a reduction in magnitude of the output tactile sensations as the waveform goes above or below the saturation points of the output that are dictated by the limits to motion of an inertial mass and/or by other components in the actuator assembly or drive electronics. For example, if high frequency oscillations are to be modified by a low frequency oscillation by simply adding the high and low frequency signals, then the inertial mass may be biased toward one end of its range, where it has less room to oscillate. This, in turn, dampens the amplitude of the resulting combined tactile sensation, so that the user feels a much reduced sensation. For example, FIG. 7 illustrates saturation levels 260 where the output waveforms may be clipped in a particular embodiment. This has occurred because the low frequency portion of the waveform has shifted the high frequency signal to one extreme of the range of motion of the inertial mass; the inertial mass no longer oscillates about its origin position, but rather near an extreme, which limits the motion of the mass in that direction and prevents the full magnitude of the tactile sensation. This can cause the tactile sensation to feel uneven or weak to the user. One solution to this is to normalize the output so that it exists within the range of the actuator assembly. For example, the amplitude of the composite waveform 258 can be reduced by the amount x %, where x=$A_1$ %+$A_2$ %−100%. In other words, waveform 258 would be re-scaled such that its maximum amplitude would not exceed 100% if the sum of amplitudes would exceed 100% without re-scaling.

A different problem that may occur using the adding technique of FIG. 7 is that, when outputting sensations of different desired frequencies, there may be an abrupt change in the output of the device when outputting a sensation below the threshold frequency, where the desired frequency signal is added to the high frequency signal, and changing that sensing to one having a frequency above the threshold frequency, at which point the desired frequency signal is output directly. For example, a particular tactile effects may be desired in which the output frequency is varied from low to high or vice versa, e.g. the frequency of the sensation is swept between two values. If this sweep crosses the threshold frequency, then the method for outputting the sensation changes from the adding method to a direct output method. This change is not smooth, and can be perceived by the user as a change in frequency and amplitude content, thus destroying much of the fidelity of the effect. Thus, the adding method does not easily allow for smooth blending between frequency regions.

Filtering and Sum of Products Method

A different embodiment of the invention mitigates some of the problems encountered in the adding method of FIG. 7. The filtering embodiment addresses the problem of driving inertial actuators in certain applications without losing the low frequency content. The method filters each effect with a low and high frequency filter and uses the low frequency signal as an envelope to modulate the high frequency signal, thus using multiplication of signals rather than using the direct addition described above. It is a filtering technique in the sense that it transforms a set of frequency and amplitude components into another set of frequency and amplitude components that is an equivalent representation of the haptic information content. The transformed set of frequency and amplitude components is more ideally matched to the output characteristics of the haptic transducer.

This approach is a time domain, real-time filter technique. A simplified sum of products method could also be implemented that saves significant firmware overhead and produces a result that is very close to the sum of products method. The simplified method could therefore (in some embodiments) can be implemented in firmware, e.g. running on a local microprocessor or other processor on the interface device. One representation of multiple effects is taken and transformed into an equivalent representation of the set of effects that takes into account the characteristics of the inertial actuator assembly. This can be described as a signal transformation or filter process. The process operates on the magnitude, frequency and phase information from commanded force effect(s) and re-combines the effect parameters to create an equivalent set of magnitude, frequency and phase parameters for the output signals and signal envelopes that are then synthesized in real time.

The process calculates gain or weighting terms for each effect using a low-pass and a high-pass filter function with a corner frequency that is implementation-dependent. In the simplified sum of products method, a weighted sum of the low-passed effect(s) combine to create a single envelope signal that then modulates the weighted sum of the high passed effect(s). In the standard sum of products method, a weighted sum of the low passed effects excluding one effect is multiplied by the high pass weighted copy of the excluded effect to yield an envelope modulated effect. The sum of all such effects multiplied by their modulation envelopes is the composite effect that is commanded to the haptic transducer. The weighting factors for both the low and high passed signals are determined by the frequency of the effect and its magnitude. The combined modulated effect is arrived at by multiplying the high pass weighted signal by the modulating envelope. The process is first described herein in terms of providing a high-strength low frequency tactile sensation, i.e., there is a single low frequency effect (waveform) that is desired to be output, and a high frequency waveform is created to combine with the commanded low frequency waveform to create a high strength sensation.

One problem, similar to the one mentioned above, is that the calculated effect might exceed the full scale output of the actuator assembly. That is, the amplifier can be commanded to 100%, and the output effect may be clipped, resulting in amplifier saturation and effect distortion, as discussed with respect to FIG. 7. To eliminate this problem, the process in accordance with one embodiment of the invention can normalize the waveforms so that the maximum commanded output from the filter is the scaled sum of the magnitudes of the component effects such that the maximum commanded output will never exceed 100% and will never have to be clipped. In some embodiments, a certain amount of saturation and distortion is acceptable in a product, and the normalized output can be slightly clipped, e.g., 20% of the output signal can be clipped. In either the pure normalized or marginally saturated case, the saturation and distortion is controlled to create a more consistent feel across different software applications. The overdrive or saturation factor can also be a value that is selectable by the user, e.g., with the value 1 providing the highest fidelity, and higher values providing higher average force output at the cost of distortion.

Figure 8:
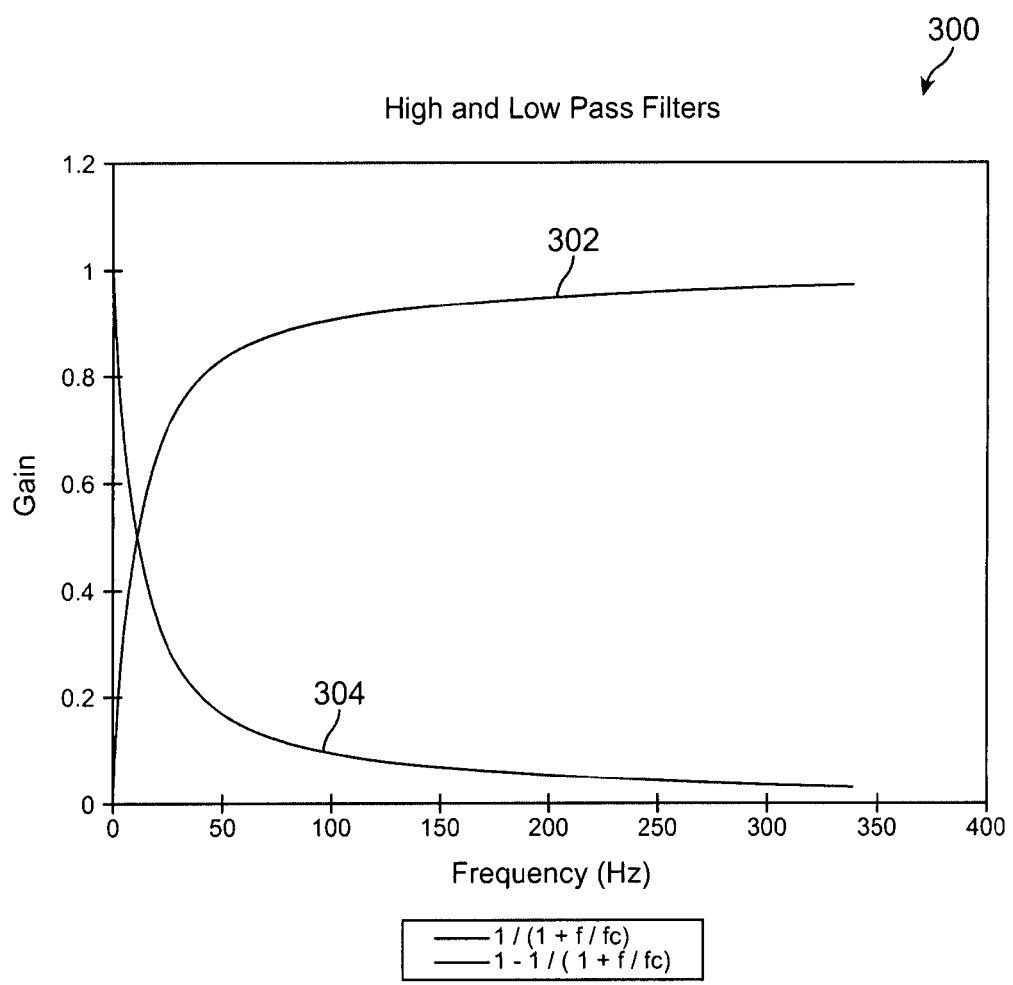
FIG. 8 is a graph illustrating high and low pass filters used in another method for providing strong low frequency tactile sensations or combining tactile sensations in accordance with one embodiment of the invention.

FIG. 8 is a graph 300 illustrating the low pass and high pass filters in accordance with one embodiment of the invention. The curve 302 represents the high pass filter, which lowers the gain of the source waveform at lower frequencies. The high pass filter is expressed by the function:

$$\alpha = 1 - 1/(1 + f/f_c) \quad (1)$$

where $\alpha$ is the high pass gain, and $f_c$ is the filter corner frequency, which is the threshold frequency as explained above.

Curve 304 represents the low pass filter, which lowers the gain of the source waveform at higher frequencies. The low pass filter is expressed by the function:

$$\beta = 1/(1 + f/f_c) \quad (2)$$

where $\beta$ is the low pass gain and $f_c$ is the threshold frequency.

Figure 9:
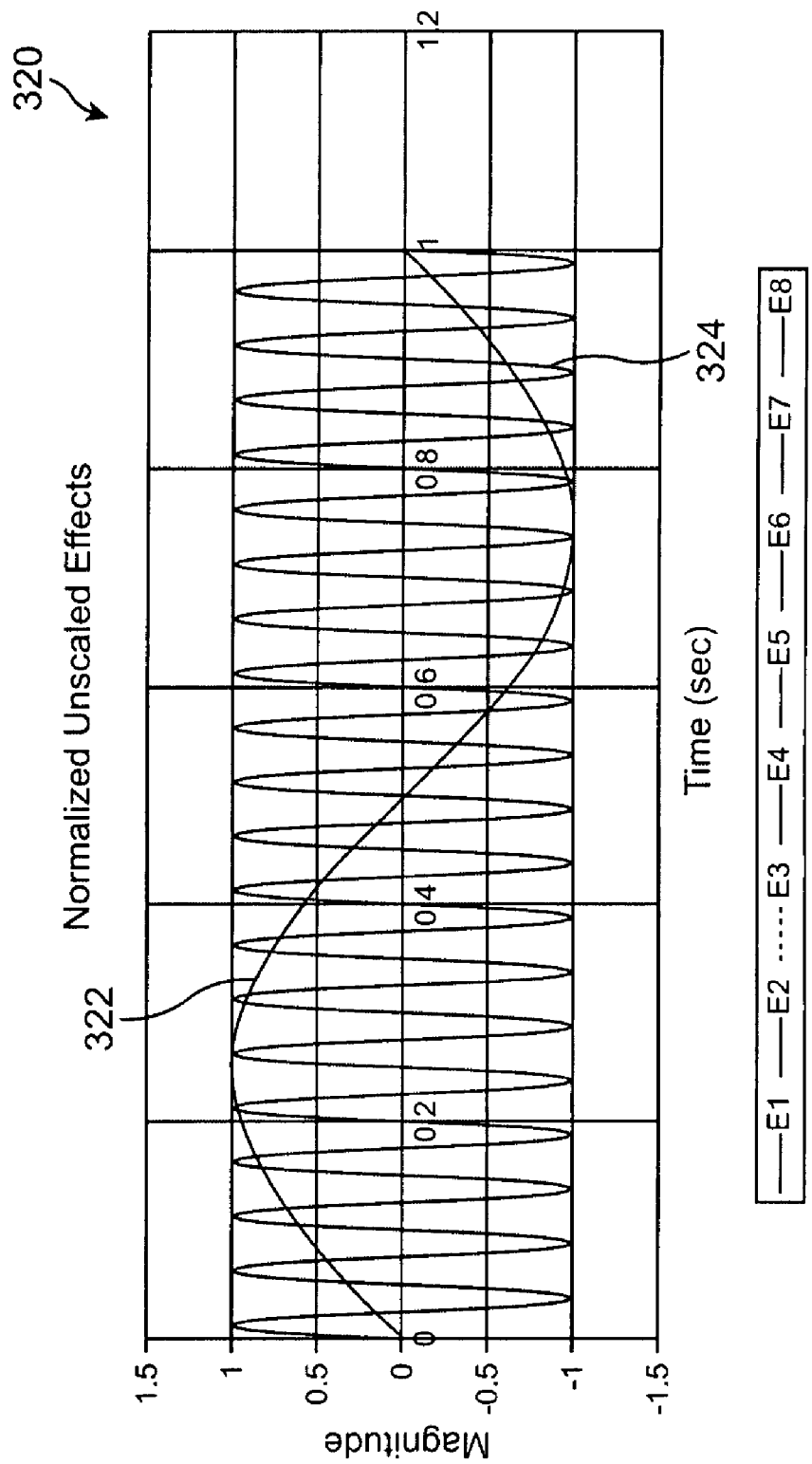
FIG. 9 is a graph illustrating a low frequency commanded waveform and a higher frequency waveform to be combined with the low frequency waveform in accordance with one embodiment of the invention.

FIG. 9 is a graph 320 illustrating two source waveforms which will be used in the present example explanation. Waveform 322 has the commanded (desired) low frequency, while waveform 324 has a higher frequency above the threshold frequency. In the example shown, waveform 322 is 1 Hz, and waveform 324 is 30 Hz. Waveform 324 can be of an arbitrarily chosen high frequency, or can be chosen to have a particular high frequency that is efficiently output by the actuator assembly. Waveforms 322 and 324 are shown normalized to a magnitude of 1. Although the waveforms are shown as sinusoids in the example, other types of waveforms can also be used, such as square waves, triangle waves, sawtooth-shaped waves, etc.

Figure 10:
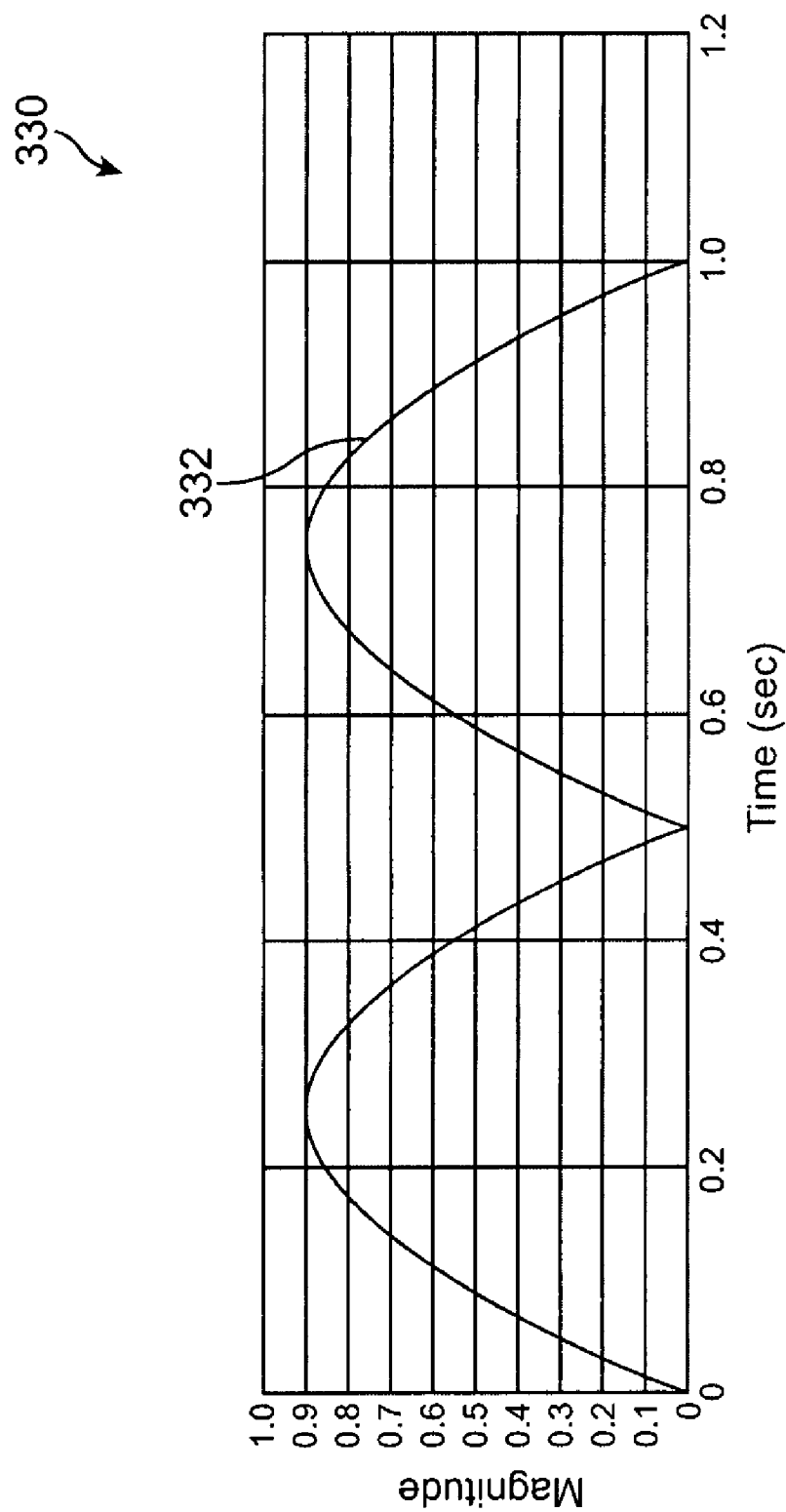
FIG. 10 is a graph illustrating a modulation envelope resulting from filtering the low frequency waveform of FIG. 9.

The low pass filter process takes each of the two effects and calculates a low pass gain $\beta$ for each effect that contributes to the modulation envelope. FIG. 10 is a graph 330 showing a waveform 332 that is the envelope function generated from the 1 Hz function. The amplitude is close to 1 since $\beta$ is almost unity for signals much less than the 10 Hz low pass corner frequency and the amplitude M of the source signal equals 1. Since this is the only other effect besides the high frequency waveform 324, and the high frequency waveform does not have a significant low pass component, waveform 332 dominates the main envelope function for the high frequency waveform.

The envelope for the nth effect can be expressed by:

$$|\Sigma_{i, i=n} \beta_i M_i \sin(\omega_i t + \phi_i)| \quad (3)$$

where i indicates the $i^{th}$ waveform, M is the magnitude, $\omega$ is the frequency, and $\Phi$ is the phase of the low frequency signal. The envelope is the sum of all the low-passed signals $\beta_{i, i=n} M_i \sin(\omega_i t + \phi_i)$, where in this case i=1 for the low frequency signal and i=2 for the high frequency signal. For the high frequency signal, n=2 and its envelope function is $|\Sigma_{i, i \neq n} \beta_i M_i \sin(\omega_i t + \phi_i)| = |\beta_1 M_1 \sin(\omega_1 t + \phi_1)|$.

To calculate the transformed effect $f_i$ (t), the high passed signal is multiplied by the modulation envelope expressed by equation (3). This can be expressed by:

$$f_i(t) = \alpha_i M_i \sin(\omega_i t + \phi_i)[|\Sigma_{j, j \neq i} \beta_j \sin(\omega_j t + \phi_j)|] \quad (4)$$

where $\alpha_i M_i \sin(\omega_i t + \phi_i)$ is the signal that has been filtered by the high pass filter and $|\Sigma_{j, j \neq i} \beta_j \sin(\omega_j t + \phi_j)|$ is the modulation envelope, and where j indicates another count of waveforms (here, e.g., j=1 can be the low frequency waveform, and j=2 can be the high frequency waveform). When i=1 (low frequency signal), the first term having the $\alpha_1$ gain term is small, and $\beta_2$ is also small so that $f_1(t)$ is very small. When i is 2 (high frequency signal), the first term is large, and the second product term (modulation envelope) is large (because with j≠i=1, $\beta_{1=}$ is large), creating an $f_2(t)$ that is substantially larger than $f_1(t)$.

Each of the product contributions $f_i(t)$ for each of the effects are added together, as expressed below:

$$f_{composite}(t) = \Sigma_i f_i(t) \quad (5)$$

Figure 11:
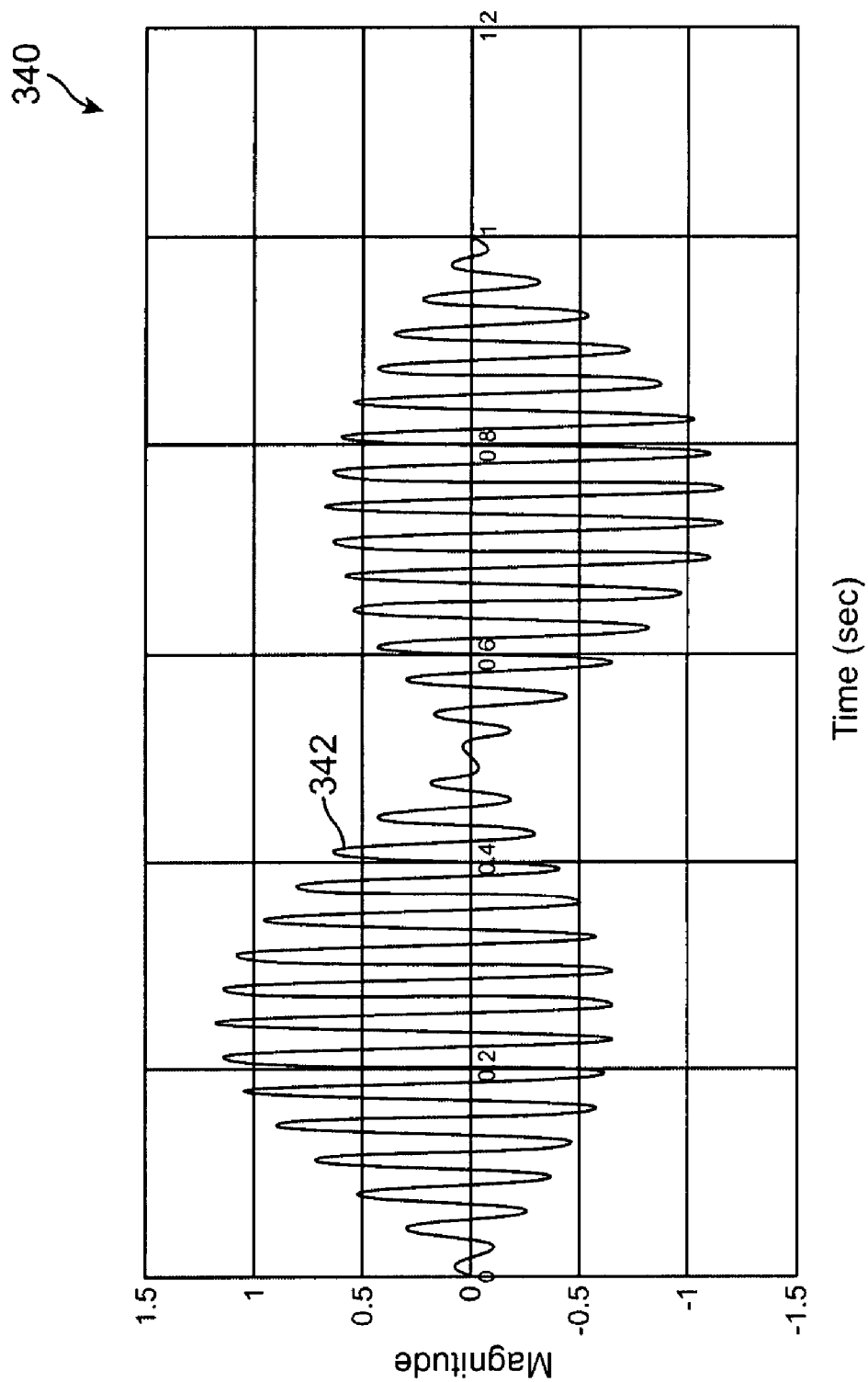
FIG. 11 is a graph illustrating a waveform resulting from the sum of products method of one embodiment of the invention.

FIG. 11 is a graph 340 showing a waveform 342 that is the non-normalized sum of the products using the two waveforms 322 and 324 in the equations shown above. The waveform 342 shows the output waveform produced by the sum of products method. The high frequency waveform (30 Hz) content is represented by the high frequency sinusoid and the low frequency (1 Hz) sinusoid is represented as the modulation envelope. Since the low frequency sinusoid is below the chosen filter corner frequency of 10 Hz, it comprises almost all of the envelope, or amplitude contour of the waveform. Since the high frequency signal is well above the corner frequency, it constitutes almost all of the high passed signal content.

The sum of products filtering method described above causes the actuator assembly of FIG. 3 to operate closer to the center of its range of motion than the addition method described above with respect to FIG. 7. Thus, the inertial mass does not become centered as close to an end to its travel as in the addition method, allowing fuller-strength tactile sensations to be output for any combined waveforms. In other words, instead of low frequency periodics being a slow moving offset in the center of travel of the inertial mass with the higher frequency periodics being damped at the extremes of travel, as in the addition method, a gain factor approach of the sum of products method keeps the inertial mass near its "sweet spot" in the center of range of travel by modulating the peak amplitude about the center of range of travel, rather than displacing the center of range of travel.

The right lobe in waveform 342 is lower than the left lobe in graph 340. This is because a small portion of the low frequency signal is passed by the high pass filter and appears as part of the signal in the output waveform. Likewise, a small portion of the high frequency signal contributes to the modulating envelope as well.

Normalization

It should be noted that, in the waveform 342, the amplitude of the waveform exceeds the full scale values of +1 and −1, which would correspond to a 100% duty cycle. As with the addition method described previously, the waveform may be clipped, resulting in signal distortion.

To reduce the clipping effect, a normalized filter can be used. The normalized filter works similarly to the standard envelope filter, but adds a normalization term $1/(1-\beta_i)$ that constrains each of the effects to a number in the range of −1 to +1. As the envelopes are calculated, the functions are likewise normalized, and frequency, amplitude and saturation scaling is applied at the last step of the process before the effect values are re-scaled into amplifier magnitude values, such as PWM values.

The waveform is normalized in that although both waveforms are of maximum magnitude, the combined effect is of magnitude 1, not magnitude 2. In fact, if two waveforms of magnitude 0.5 were combined, the output waveform would have a peak output of 1. Only if the sum of the effect magnitudes is less than 1 will the combined effect be below 1, and will simply be the sum of the composite waveform magnitudes. The normalization can be thought of as an automatic gain control that scales the output of the filter so that the peak output function will never exceed the maximum commandable amplitude.

To normalize the effects, the following equations can be used:

$$\alpha_i = [1 - 1/(1 + f_i/f_c)] \tag{6}$$

$$\beta_i = 1/(1 + f_i/f_c) \tag{7}$$

$$\alpha_{i\,norm} = \alpha_i / (\Sigma_{j=1,n} \alpha_j) \tag{8}$$

$$\beta_{i\,norm} = \beta_i / (\Sigma_{j=1,n;j\ne 1} \beta_j) \tag{9}$$

Once the normalized gain terms $\alpha_{i\,norm}$ and $\beta_{i\,norm}$ are found in the equations above, the equations (4) and (5) can be used to find the resulting waveform to be output. The central idea is to modify the low and high pass gain terms so that the sum of the low pass gains equals one, and, likewise, the sum of the high pass gains equals one.

Figure 12:
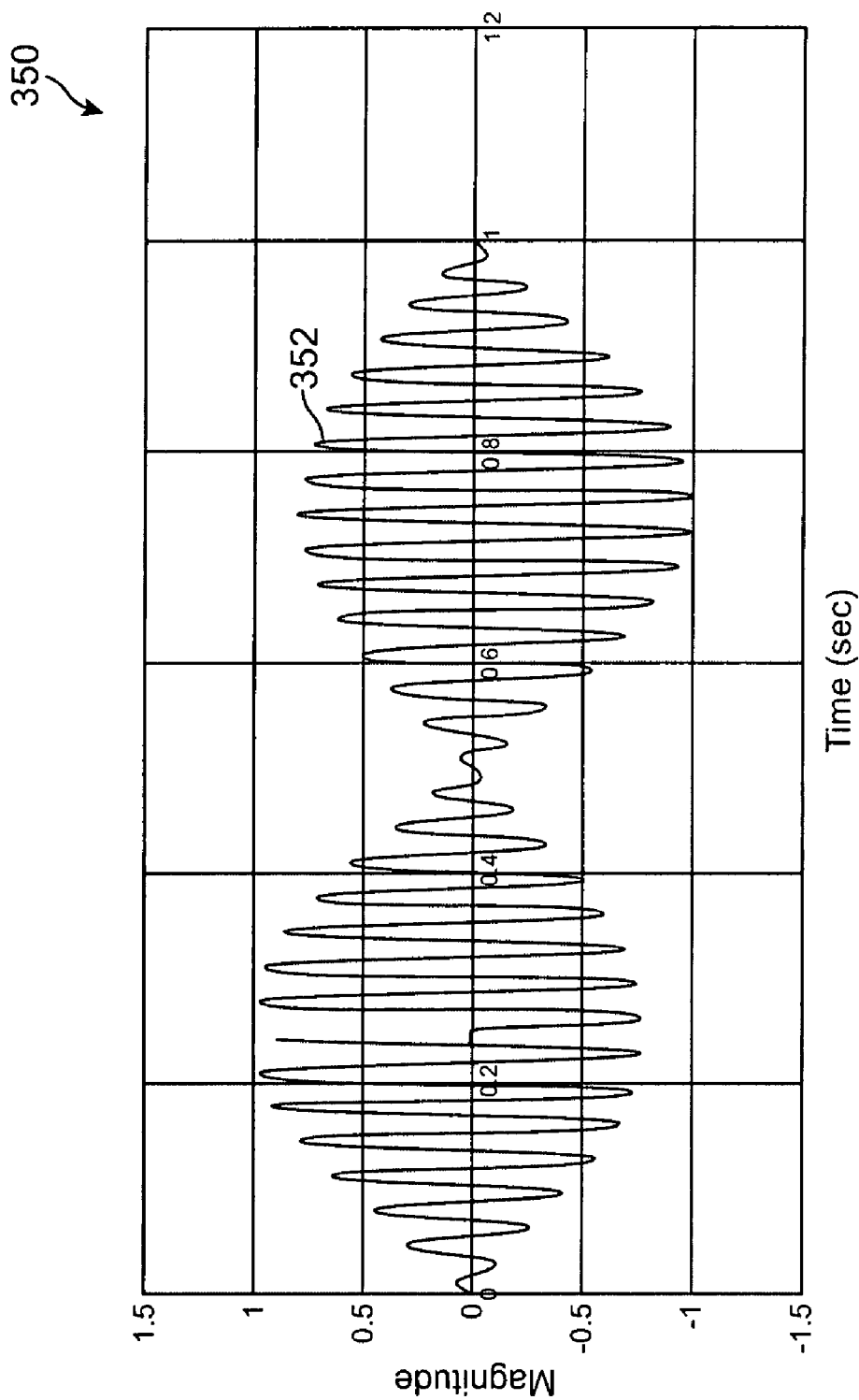
FIG. 12 is a graph illustrating the waveform of FIG. 11 when using normalized terms.

The normalized output from the filter of one embodiment of the invention is shown as waveform 352 in graph 350 of FIG. 12. The amplitude of the waveforms does not exceed +1 and −1. In other embodiments, as mentioned above, a small amount of excess over the saturation limits can be permitted, since the minor amount of such clipping may not be noticeable to the user.

Simplified Sum of Products

The pure solution $$f_{composite}(t) = \Sigma_i f_i(t) = \alpha_i M_i \sin(\omega_i t + \phi_i) [|\Sigma_{j,j\ne i} \beta_i \sin(\omega_j t + \phi_j)|]$$

can be simplified as $$f_{composite}(t) = \Sigma_i f_i(t) = \alpha_i M_i \sin(\omega_i t + \phi_i) [|\Sigma_j \beta_i \sin(\omega_j t + \phi_j)|].$$

Note that a single envelope function is applied to each source effect. It is not necessary to calculate a separate envelope function for each source effect. This reduces the number of function value computations from n*(n−1) to n+1. Although each n source effect makes a contribution to its own envelope function, the contribution will distort the envelope function to a small degree as high frequency source effects have small $\beta_n$ values and contribute little to the envelope function. The simplified solution may be more appropriate in some embodiments, e.g. a less sophisticated processor or as a firmware solution as explained below.

Normalization and Combining

The waveform 352 resulting from the normalizing filter described above would typically feel quite adequate to the user. However, the output can be improved further. In the graph 350 of FIG. 12, the output is shown to go to zero at 0.5 seconds. Waveform 350 conveys both the high frequency signal information as well as the low frequency envelope detail, but the amplitude of the resulting waveform 352 may not be desirable to go to zero. For example, a constant high frequency repeating pulse may be desired during the output of the low frequency, and the user would notice when the waveform went to zero. To alleviate this zeroed portion of the waveform, a superposition of the envelope with the high frequency signal is performed to convey the low frequency information and the high passed high frequency signal. This is accomplished by a normalizing and combining filter. The combining filter combines the envelope modulated low frequency information with the high passed effect signal. The normalized and combined filter can be implemented with the following equations:

$$\alpha_i = [1 - 1/(1 + f_i/f_c)] \tag{10}$$

$$\beta_i = 1/(1 + f_i/f_c) \tag{11}$$

$$A_{i\,norm} = \alpha_i M_i / (\Sigma_{j=1,n} \alpha_j M_j) \tag{12}$$

$$\beta_{i\,norm} = \beta_i M_i / (\Sigma_{j=1,n} \beta_j M_j) \tag{13}$$

$$G = G_{sat} \text{ if } \Sigma M_i > G_{sat} \text{ else } G = \Sigma M_i;\ G_{sat} = 1 \text{ for normalized} \tag{14}$$

$$f_{combined}(t) = G \Sigma_i \{A_i M_i \sin(\omega_i t + \phi_i)[1 + \Sigma_{j,j\ne 1}|B_i \sin(\omega_j t + \phi_j)|/(1-B_i)]\} \tag{15}$$

Figure 13:
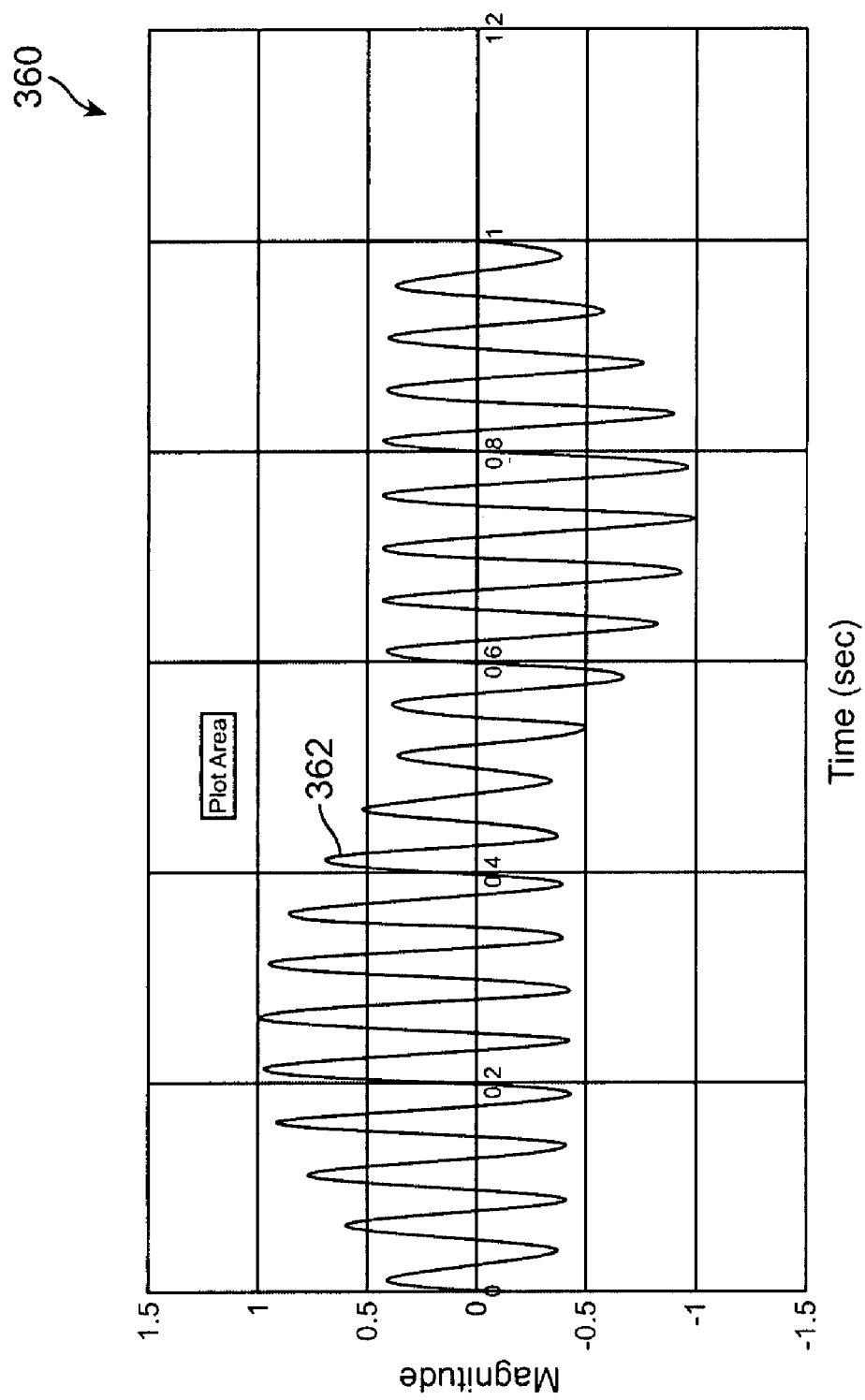
FIG. 13 is a graph illustrating the waveform of FIG. 12 after having been combined again with the higher frequency waveform of FIG. 9.

G is a gain term that can be used to adjust the amplitude of the final waveform, where $G_{sat}$ is a predetermined saturation level above which the amplitude cannot go. The $G_{sat}$ term is typically 1 when normalized, but can be increased (e.g., to 1.2) if some saturation is desired. The combining equation (15) adds the high frequency signal to the normalized waveform result shown in FIG. 12. FIG. 13 is a graph 360 showing a waveform 362 that is the final result of the normalizing and combining filter. The waveform conveys both the low frequency periodic and the constant high frequency periodic. As shown, the portion of the waveform 362 around t=0.5 seconds has an amplitude substantially greater than zero, so that the user never feels the absence of the high frequency waveform with the low frequency envelope.

Depending on the desired embodiment, the equations and functions listed herein can be calculated on the host computer or on a local device processor (if present), or they can be split between the host processor and the local device processor. For example, the host can calculate every force value and stream the values to the interface device, as described in copending application Ser. No. 09/687,744, incorporated herein by reference. Alternatively, a device processor can calculate equation (15) or additional equations based on values and parameters passed to it by the host computer.

It should be noted that the equations (10) through (14) need only be calculated when the effects are changed, e.g., when there is a change to the commanded frequency of either waveform or when the threshold frequency is changed. Equation (15), however, calculates the actual position of the inertial mass of the actuator assembly for each cycle of output, e.g. at 1 kHz. Thus, the method including equation (15) can be computationally intensive, especially for those embodiments employing less sophisticated processors. Thus, in alternate embodiments, the equation (15) can be approximated or estimated with less complex computations. For example, the simplified sum of products method above can be used, although other methods can also be used to reduce the computational overhead.

Some force effects may require more frequent updates. For example, texture force effects provide output pulses or vibrations based on the position of the cursor/device with respect to predetermined areas spatially located in the workspace of the device and/or in the associated displayed graphical environment. In some embodiments, the frequency of output tactile sensations related to textures is dependent on the velocity of the user manipulandum in its workspace. If this is the case, then Equation (10) through Equation (15) can be calculated at the force update rate (e.g. 1 kHz). Or, the effective frequency can be assumed to be a value much less than $f_c$, allowing the normalized sum of products to be calculated using the texture magnitude, with the spatial position (e.g., x or y coordinate) substituted for time t in the equation, or velocity (multiplied by a constant) substituted for the frequency $\omega$.

Figure 14:
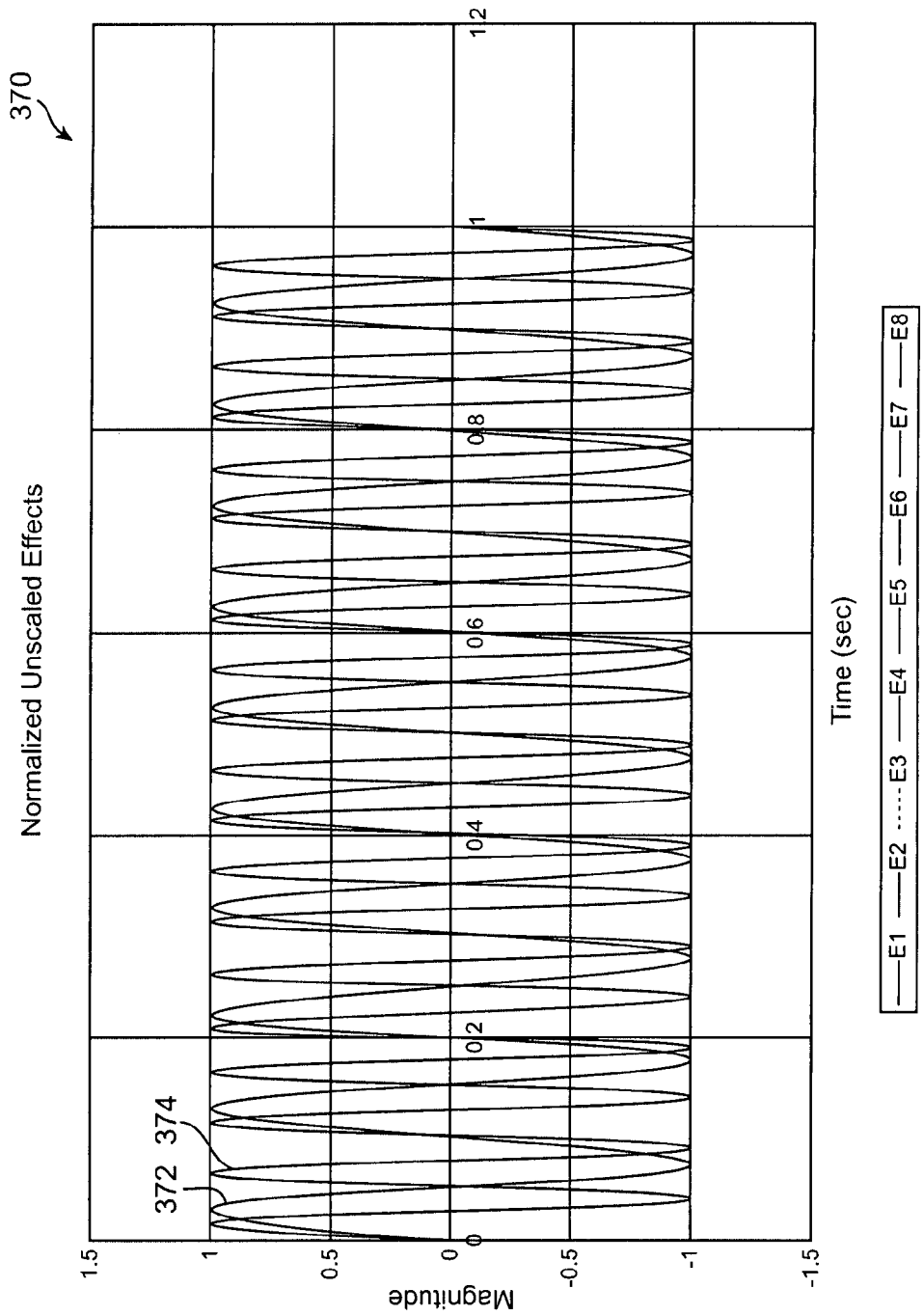
FIG. 14 is a graph illustrating another example of a low frequency commanded waveform and a higher frequency waveform to be combined with the low frequency waveform.
Figure 15:
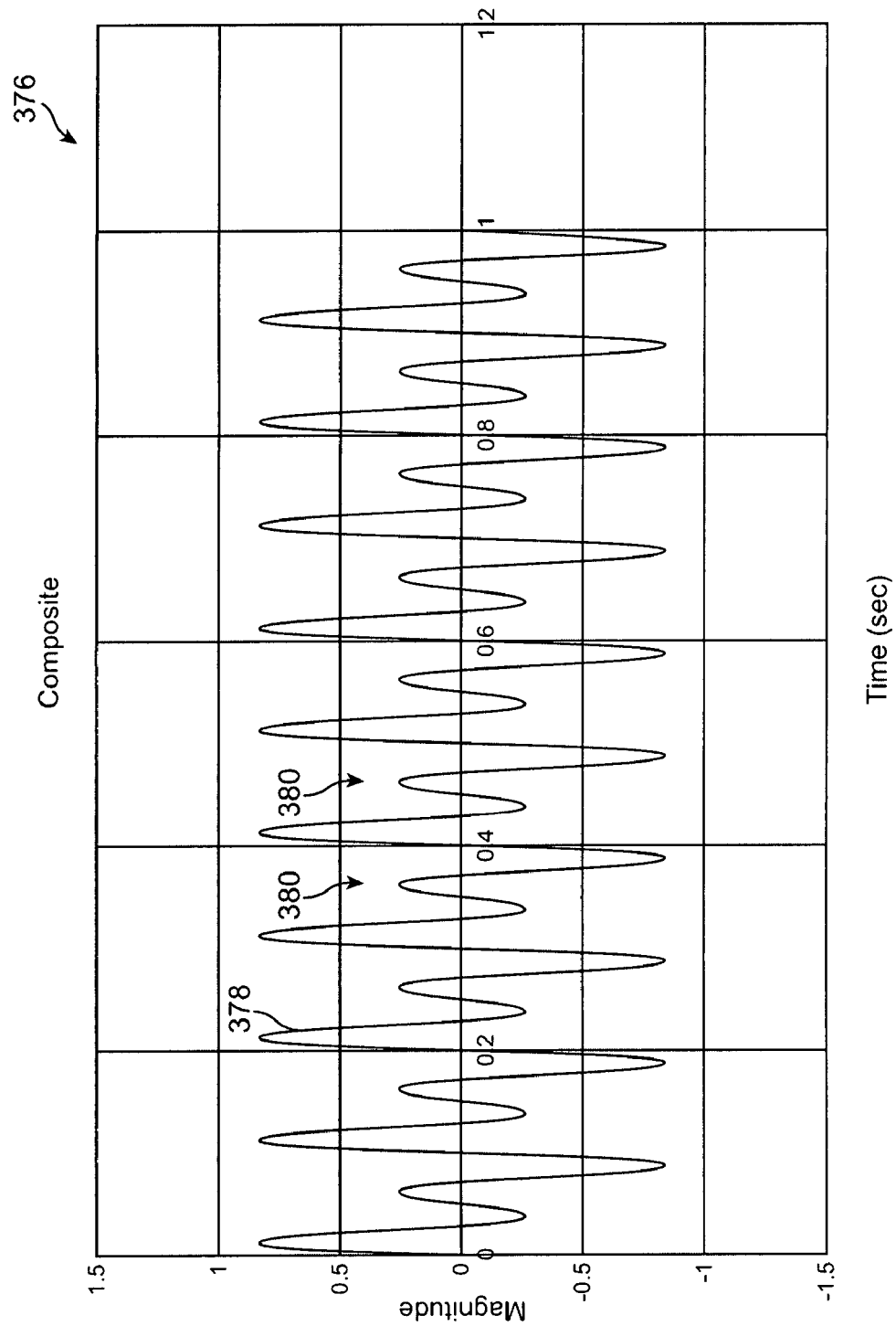
FIG. 15 is a graph illustrating the combined normalized result of the sum of products method using the waveforms of FIG. 14.

FIGS. 14 and 15 show another example of outputting a sum of products waveform in which the low frequency waveform is closer to the threshold frequency $f_c$ and the high frequency waveform is also closer to the threshold frequency. In this example, the low frequency waveform is at 10 Hz, while the high frequency waveform is at 20 Hz, with a threshold frequency at 15 Hz. In FIG. 14, graph 370 shows low frequency waveform 372 and high frequency waveform 374 as separate waveforms. The graph 376 of FIG. 15 shows the resulting waveform 378 when using the normalizing and combining filter described above with these two waveforms 372 and 374. As shown, the resulting waveform 378 roughly follows the low frequency waveform 372 with the large peaks and valleys, while the intermediate oscillations 380 create the high frequency that helps provide high strength tactile sensations.

Resonant Filter

A resonant filter is one in which the output signal of the filter is at or near the resonant frequency of the mechanical system, as explained above, and the commanded effect waveform appears as a modulation envelope. This approach can be used with actuators such as the actuator assembly described with reference to FIG. 3, or, more appropriately, with a piezo transducer or other type of actuator where the output magnitude has a high Q response around a definite frequency, i.e. those actuators having a definite frequency range in which the output sensations are quite strong as compared to sensations output at frequencies outside that range.

A resonant filter can be provided by using the normalized version of the envelope modulation described above. The resonant filter uses one resonant signal with a frequency at the resonant frequency of the system, but of low amplitude. The commanded waveform(s) are used to calculate the envelope only, which then modulates (multiplies) the resonant signal. This is similar to the sum of products method described above, but the resonant form of the filter is actually simpler in that the envelope for the normalized but uncombined filter in the calculation is the summation of envelopes times the resonant signal instead of the summation of the high passed signal times its modulation envelope. An example of a resonant filter output is shown:

$$f_{res}(t) = G A_r M_r \sin(\omega_r t + \phi_r)[1 + \Sigma_{j,j \neq r} |B_r \sin(\omega_j t + \phi_j)|/(1 - B_r)]$$ (16)

Equation (16) differs from Equation (15) in that there is no summation of the two functions f(t) for the two (or more) effects; instead, only one f(t) is calculated, where the first term is the resonant signal and the second term is the summation of envelopes from the commanded waveform(s). Thus, the small portion of the low frequency signal that was passed by the high pass filter and appeared as part of the signal in the output waveform for the sum of products method, above, does not appear in the final waveform of the resonant filter. This causes the final waveform to be fully centered about the center of travel of the inertial mass of the actuator assembly (horizontal axis in the graph) at all times. This can allow stronger sensations in many embodiments, at the cost of slightly less low frequency information conveyed to the user.

Combining Two or More Commanded Tactile Sensations

The filters described above are mainly described with respect to providing a single desired low frequency tactile effect by combining it with a "dummy" high frequency effect. In other embodiments (n>2), multiple commanded effects can be combined with each other using the filters described above to achieve a strong output by the actuator assembly of FIG. 3. Oscillating inertial mass devices, such as the actuator assembly of FIG. 3, may have problems superimposing two or more different tactile sensations of different frequencies, especially when one sensation has a high frequency and the other sensation has a low frequency. For example, instead of using a predetermined high frequency signal, the two signals to be filtered and combined can be commanded as two simultaneous effects that are to be output. The commanded waveforms can have either a low frequency below the threshold frequency or a high frequency above the threshold frequency.

Furthermore, three or more effects can be combined, where the contributions of the effect waveforms are summed as indicated in the equations above. For example, if there are more than two effect waveforms, then a composite envelope can be formed by the combination of the low passed versions of the signals except for the signal that is being envelope modulated. That is to say, the composite envelope of effects 1 and 2 modulate the high passed signal resulting from effect 3. In order to calculate the output force, the high passed signal is multiplied by its modulation envelope and each of the signals that are likewise modulated are summed.

One advantage to combining two or more commanded effect waveforms, instead of simply adding the waveforms together, includes providing a more centered range of motion for the oscillating inertial mass of the actuator. As explained above, adding the waveforms may cause the inertial mass to oscillate about a point close to an end of travel, which dampens and/or clips the output forces. An embodiment of the invention centers the inertial mass closer to the center of its range of travel. In some embodiments, a resonant filter can be used to combine multiple commanded effects, which centers the inertial mass still further, as explained above.

Figure 16:
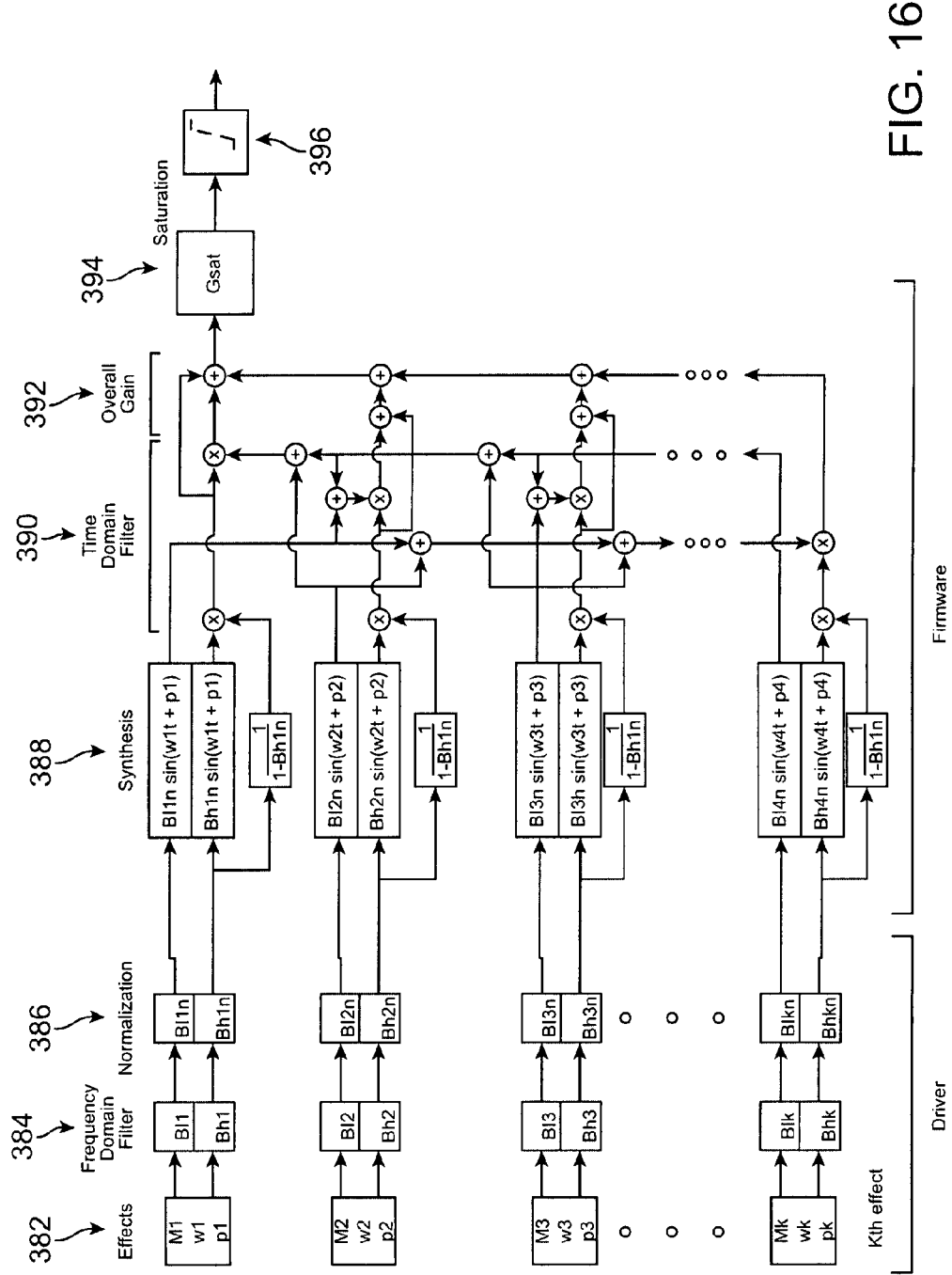
FIG. 16 is a block diagram illustrating the sum of products method for combining waveforms in accordance with one embodiment of the invention.

FIG. 16 is a block diagram illustrating the filters, which can be used for combining multiple effects in accordance with one embodiment of the invention. This block diagram includes the operations of equation (15) set forth above. Each effect 382 is shown on the left, defined by magnitude (M), frequency (w), and phase (p). A frequency domain filter 384 is applied to each effect, each filter including high pass (Bh) and low pass (Bl) filters. The high passed component and the low pass component are passed through corresponding high and low pass components of the normalization function 386. The waveforms and envelopes are synthesized in block 388 from the input parameters M, w, and p and the outputs from normalization function 386, and the outputs from the various synthesis blocks are added, multiplied, and combined, as shown, in accordance with equations (14) and (15) in the time domain filter 390. An overall gain is provided by the operations 392. Saturation is provided by a gain block 394, in those embodiments desiring such an operation, and a saturation block 396 which saturates the amplitude of the waveform to the predetermined limits of the hardware outputting the forces. The saturated waveform is sent to actuators and related circuitry (not shown) to output the force to the user of the interface device.

While this invention has been described in terms of several preferred embodiments, it is contemplated that alterations, permutations and equivalents thereof will become apparent to those skilled in the art upon a reading of the specification and study of the drawings. For example, many different types of haptic sensations can be provided with the actuator assembly of the present invention. Furthermore, certain terminology has been used for the purposes of descriptive clarity, and not to limit the present invention. It is therefore intended that the following appended claims include alterations, permutations, and equivalents as fall within the true spirit and scope of the present invention.

The invention claimed is:

1. A method, comprising:
   receiving a first frequency at which to output a tactile sensation;
   determining a second frequency higher than the first frequency, the second frequency based on a frequency at which an inertial actuator outputs a second tactile sensation; and
   combining a waveform having the first frequency and a waveform having the second frequency to produce a signal configured to cause a composite tactile sensation at the second frequency, the composite tactile sensation conveying the first frequency.

2. The method of claim 1 wherein combining includes providing multiple bursts of a signal at the second frequency at approximately the first frequency to control the inertial actuator to output the composite tactile sensation.

3. The method of claim 2 wherein the inertial actuator includes an inertial mass that is oscillated bi-directionally, and wherein the bursts each control at least three changes of direction of the inertial mass at the second frequency.

4. The method of claim 2 wherein the second frequency is approximately equal to a resonance frequency of the inertial actuator.

5. The apparatus of claim 2 wherein the second frequency is approximately equal to a resonance frequency of the inertial actuator.

6. The method of claim 1 wherein the second frequency is high enough so as to cause a user to feel each of said bursts as a single pulse.

7. The apparatus of claim 1 wherein the second frequency is high enough so as to cause a user to feel each of said bursts as a single pulse.

8. A method for providing haptic sensations using an actuator in an interface device, the method comprising:
   receiving a first frequency at which to output a tactile sensation to said interface device;
   determining a second frequency higher than the first frequency, the second frequency approximately equal to a resonance frequency of an actuator system of said interface device; and
   combining a waveform having the first frequency and a waveform having the second frequency to produce a signal configured to cause a composite tactile sensation at the second frequency, the composite tactile sensation conveying the first frequency.

9. The method of claim 8 wherein said combining includes outputting bursts having second frequency at a rate corresponding to said first frequency.

10. The method of claim 9 wherein said burst includes at least three changes of direction of an inertial mass of said actuator.

11. The method of claim 8 wherein said combining includes creating a waveform having said second frequency, said waveform having an amplitude that varies according to said first frequency.

12. The method of claim 8 wherein said mechanical actuator is coupled to a flexure, wherein said actuator system provides an inertial mass that moves bi-directionally to output said first frequency tactile sensations.

13. The method of claim 8 wherein said determining said second frequency includes retrieving a second frequency value from a memory.

14. The method of claim 8 wherein said first frequency is combined with said second frequency to produce the signal only when said first frequency is lower than a predetermined threshold frequency.

15. A non-transitory processor-readable medium comprising code representing instructions to cause a processor to perform a method, the method comprising:
   receiving a first frequency at which to output a tactile sensation to said interface device;
   determining a second frequency higher than the first frequency, the second frequency approximately equal to a resonance frequency of a mechanical actuator system of said interface device; and
   combining a waveform having the first frequency and a waveform having the second frequency to produce a signal configured to cause a composite tactile sensation at the second frequency, the composite tactile sensation conveying the first frequency.

16. The non-transitory processor-readable medium of claim 15 wherein said combining includes outputting bursts having said second frequency at a rate corresponding to said first frequency.

17. The non-transitory processor-readable medium of claim 16 wherein said burst includes at least three changes of direction of an inertial mass of said inertial actuator.

18. The non-transitory processor-readable medium of claim 15 wherein said combining includes creating a waveform having said second frequency, said waveform having an amplitude that varies according to said first frequency.

19. The non-transitory processor-readable medium of claim 15 wherein said mechanical actuator is coupled to a flexure, wherein said mechanical actuator provides an inertial mass that moves bi-directionally to output said first frequency tactile sensations.

20. The non-transitory processor-readable medium of claim 15 wherein said determining said second frequency includes retrieving a second frequency value from a memory.

21. The non-transitory processor-readable medium of claim 15 wherein said first frequency is combined with said second frequency to produce the signal only when said first frequency is lower than a predetermined threshold frequency.

22. A haptic feedback interface device for providing a tactile sensation, the interface device comprising:
   a sensor operative to detect motion of a user manipulandum, said sensor providing sensor data representative of said motion;
   an actuator device operative to output tactile sensations on said user manipulandum or a housing of said interface device, wherein said actuator device includes an inertial mass that is oscillated to provide said tactile sensation; and
   a controller providing a signal to said actuator device to cause said actuator device to output said tactile sensation to said user, at least a portion of said signal having a first frequency approximately equal to a resonance frequency of the actuator device and wherein said tactile sensation conveys a second frequency lower than the first frequency, the second frequency commanded to said tactile device.

23. The haptic feedback interface device of claim 22 wherein said signal provided by said controller includes first frequency bursts that are output at said second frequency.

24. The haptic feedback interface device of claim 22 wherein said entire signal provided by said controller has said first frequency, and wherein said first frequency signal varies in amplitude according to said second frequency.

25. The haptic feedback interface device of claim 24 wherein said signal provided by said controller is based on using a resonant filter by providing an envelope based on a signal having said second frequency and modulating a signal having said first frequency using said envelope.

26. An apparatus for providing tactile sensations using an actuator, the apparatus comprising:

means for receiving a first frequency at which to output a tactile sensation;

means for determining a second frequency higher than the first frequency, the second frequency based on a frequency at which an inertial actuator outputs a second tactile sensation;

and means for combining a waveform having the first frequency and a waveform having the second frequency to produce a signal configured to cause a composite tactile sensation at the second frequency, the composite tactile sensation conveying the first frequency.

27. The apparatus of claim 26 wherein combining includes providing multiple bursts of a signal at the second frequency at approximately the first frequency to control the inertial actuator to output the composite tactile sensation.

28. The apparatus of claim 27 wherein the inertial actuator includes an inertial mass that is oscillated bi-directionally, and wherein the bursts each control at least three changes of direction of the inertial mass at the second frequency.

* * * * *